US012793329B2

(12) United States Patent
Zhang et al.

(10) Patent No.: US 12,793,329 B2
(45) Date of Patent: Nov. 10, 2026

(54) SUBSURFACE SCATTERING FOR REAL-TIME RENDERING APPLICATIONS

(71) Applicant: NVIDIA Corporation, Santa Clara, CA (US)

(72) Inventors: Tianyi Zhang, Santa Clara, CA (US); Blagovest Borislavov Taskov, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 242 days.

(21) Appl. No.: 18/152,320

(22) Filed: Jan. 10, 2023

(65) Prior Publication Data

US 2024/0233251 A1 Jul. 11, 2024

(51) Int. Cl.
*G06T 15/50* (2011.01)
*G06T 15/06* (2011.01)

(52) U.S. Cl.
CPC ............ *G06T 15/506* (2013.01); *G06T 15/06* (2013.01); *G06T 2210/21* (2013.01); *G06T 2210/52* (2013.01)

(58) Field of Classification Search
CPC ... G06T 15/506; G06T 15/06; G06T 2210/21; G06T 2210/52
See application file for complete search history.

(56) References Cited

U.S. PATENT DOCUMENTS 11,063,556 B1 * 7/2021 Piatt ........................ H02J 3/004
2009/0096789 A1 * 4/2009 Peterson ................. G06T 15/06 345/426
2009/0219287 A1 * 9/2009 Wang ...................... G06T 15/50 715/764
2014/0204087 A1 * 7/2014 Habel ................... G06T 15/506 345/426
2021/0049807 A1 * 2/2021 Wright .................... G06T 15/06
2021/0142555 A1 * 5/2021 Karlík ................... G06T 15/506
2022/0406002 A1 * 12/2022 Boisse .................... G06T 15/50
2023/0027890 A1 * 1/2023 Zhao ....................... G06T 15/04

(Continued)

OTHER PUBLICATIONS

Ouyang, Y., et al.;"ReSTIR GI: Path Resampling for Real-Time Path Tracing"; High-Performance Graphics, vol. 40, No. 8, 2021 13pgs. (Year: 2021).*

(Continued)

*Primary Examiner* — Michael Le
(74) *Attorney, Agent, or Firm* — IRON SUMMIT IP LLP

(57) ABSTRACT

Light transport simulation algorithms or techniques may be used to generate a sample for a subsurface scattering of light, then a target function may be used to improve the sample. The target function may correspond to an amount of energy transported to the surface from within the object. The sample may be resampled using the sample and the target function to update a reservoir of samples. A resampled sample may be selected and used as a lighting sample for the subsurface scattering. Rather than using the resampled sample, it may be used with the target function to again update the reservoir and select another resampled sample from the updated reservoir. This may be performed for any number of iterations to determine the lighting sample for the frame. A backside lighting cache may be used in the ray tracing to determine lighting at the backside of the object.

20 Claims, 21 Drawing Sheets

(56) References Cited

U.S. PATENT DOCUMENTS

| | | | | |
|---|---|---|---|---|
| 2023/0076326 | A1* | 3/2023 | Xu | G06T 15/503 |
| 2024/0193847 | A1* | 6/2024 | Tokuyoshi | G06T 15/06 |

OTHER PUBLICATIONS

Christensen, P.H., et al.; "Approximate Reflectance Profiles for Efficient Subsurface Scattering"; Pixar Techinical Memo #15-04, Jul. 2015, 7 pgs.
Ouyang, Y., et al.; "ReSTIR GI: Path Resampling for Real-Time Path Tracing"; High-Performance Graphics, vol. 40, No. 8, 2021, 13 pgs.
Bitterli, B., et al.; "Spatiotemporal reservior resampling for real-time ray tracing with dynamic direct lighting"; ACM Trans. Graph, vol. 39, No. 4, Art. 148, Jul. 2020, 17 pgs.

* cited by examiner

SUBSURFACE SCATTERING FOR REAL-TIME RENDERING APPLICATIONS

BACKGROUND

Subsurface scattering is a complex phenomenon that is prominent in solid materials having high scattering coefficients. Such materials include wax, human skin, marble, plastic, and milk. In subsurface scattering, when light is transmitted into an object, the light initially travels in the refraction direction, but scattering causes it to change direction repeatedly until it leaves the material. Light from subsurface scattering may be modeled probabilistically, by integrating over possible paths or by approximating such an integral. In some conventional approaches, a physics-based model may be used to compute subsurface scattering in which Monte Carlo simulation is used to approximate the integral. For example, at a surface of an object lighting that is sampled using a ray may account for one direction (of many possible directions) in which light particles may scatter from the surface. Due to the potentially large number of samples, the computational resources required to render such a scene may impose too great of a delay for real-time or near real-time rendering applications, such as gaming.

As such, conventional approaches to modeling subsurface scattering for real-time or near real-time rendering applications have relied on a precomputed diffusion profile. The diffusion profile may be created from curve fitting a Monte Carlo result generated under a two-dimensional (2D) search light configuration. In the search light configuration, a light beam travels a perpendicular path into a semi-infinite flat surface. The Monte Carlo result may be produced by measuring the amount of light that exits the surface at different distances from the light beam. As an infinite width and thickness of an object is assumed, a diffusion profile may produce inaccurate results when light entering from the back of the object relative to a camera has a substantial contribution to subsurface scattering for a surface point. The diffusion profile may also produce inaccurate results when the surface has low density or the geometries are thin so that light quickly escapes the volume and exits the geometries. Such examples include thinner areas of materials such as jade, the human body (e.g., ears, nostrils), plastics, or colored glass.

SUMMARY

Embodiments of the present disclosure relate to subsurface scattering for real-time or near real-time rendering applications. More specifically, the disclosure relates to approaches for simulating subsurface scattering of light within an object while generating higher quality samples, allowing for high quality renderings of environments using fewer samples.

In contrast to conventional approaches, such as those described above, disclosed approaches may use light transport simulation techniques (e.g., ray tracing, path tracing, etc.) to generate one or more samples for a subsurface scattering of light within an object, then importance sampling of an estimated probability density function (PDF) may be performed to improve the quality of the one or more samples (e.g., through resampling). The PDF may correspond to an amount of energy transported to the surface from within the object. One or more reservoirs of samples may be maintained for pixels over a plurality of frames and may be used for reservoir resampling. In one or more embodiments, the one or more samples may be resampled using the one or more samples and the estimated PDF to update the one or more reservoirs of samples. One or more resampled samples may be selected from the updated one or more reservoirs and used as a sample(s) that defines energy at the subsurface scattering (e.g., to define a direction(s) of one or more rays which may directed toward one or more light sources for next event estimation to determine a shading result). In some cases, rather than using the one or more resampled samples to define the energy, the one or more resampled samples may be used with the PDF to again update the one or more reservoirs, and at least one resampled sample may be selected from the updated one or more reservoirs for use in defining the energy. This approach to resampling may be performed for any number of iterations to determine the lighting samples for the frame.

In further respects, a sample for subsurface scattering may be computed based at least on to an amount of energy (e.g. irradiance) received from light entering a backside of an object (e.g., the boundary term). Rather than tracing one or more rays to determine the energy while evaluating subsurface scattering, one or more embodiments may use one or more backside lighting caches (e.g., irradiance caches) to quickly determine (e.g., retrieve) energy (e.g., irradiance) for interactions with the backside of an object. To store lighting in a backside lighting cache, one or more rays may be cast from a camera and enter an object. One or more interactions of the one or more rays with the object from within the object may be detected. Lighting entering the object from locations corresponding to the one or more interactions may then be computed using any suitable approach, such as a ray tracing pass. The energy may be stored in the backside lighting cache(s) and accessed when simulating subsurface scattering.

BRIEF DESCRIPTION OF THE DRAWINGS

The present systems and methods for subsurface scattering for real-time rendering applications are described in detail below with reference to the attached drawing figures, wherein.

DETAILED DESCRIPTION

Figure 1:
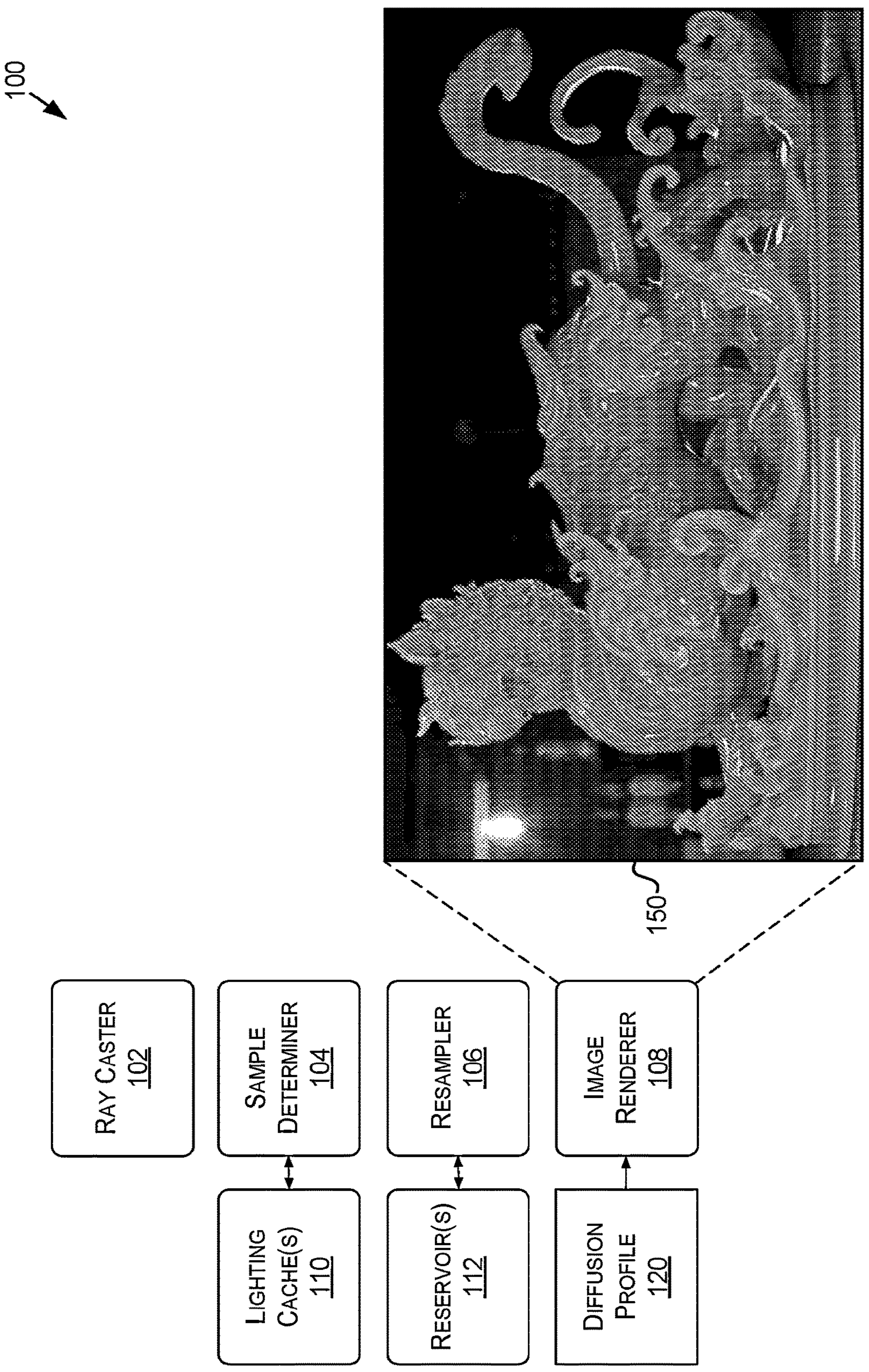
FIG. 1 depicts an example of a lighting simulation system, in accordance with some embodiments of the present disclosure.

The present disclosure relates to subsurface scattering for real-time or near real-time rendering applications. More specifically, the disclosure relates to approaches for simulating subsurface scattering of light within an object while generating higher quality samples, allowing for high quality renderings of environments using fewer samples.

Disclosed approaches may use ray tracing to generate one or more samples for a subsurface scattering of light within an object, then a target function, such as a probability density function (PDF) may be used to improve the quality of the one or more samples (e.g., through resampling). The one or more samples may be generated using a source function, which may define a direction of one or more rays scattered from an interaction to generate the samples. The target function may correspond to an amount of energy transported to the surface from within the object. As such, the target function may be used to improve the quality of the samples for the interaction. In at least one embodiment, the target function may be based at least on one or more scattering distances of one or more rays within the object, lighting corresponding to one or more interactions of the one or more rays scattered with the object, and/or one or more material properties associated with the object.

In at least one embodiment, the one or more samples may be generated to simulate a single scattering transmission within the object, thereby avoiding significantly higher processing requirements required for ray tracing multi-scattering transmission. A suitable target function used with single scattering transmission may include one or more parameters of a boundary term of a lighting equation, where the lighting equation models the single scattering transmission. At least some of the lighting energy for an interaction from multi-scattering transmission may be pre-integrated, pre-computed, or otherwise determined using a lower-cost method, then combined with the lighting energy computed for single scattering transmission. For example, a diffusion profile may be used, while removing at least some lighting energy due to single scattering transmission that may typically be included in the diffusion profile.

In one or more embodiments, the one or more samples of energy (lighting energy) for subsurface scattering from an interaction may be resampled using the one or more samples and the target function. For example, the one or more samples and the target function may be used to update one or more reservoirs of samples maintained for pixels over a plurality of frames. One or more resampled samples may be selected from the updated one or more reservoirs and used as lighting samples for the interaction. In at least one embodiment, rather than using the one or more resampled samples as lighting samples, the one or more resampled samples may be used with the target function to update the one or more reservoirs, and at least one resampled sample may be selected from the updated one or more reservoirs. This approach to resampling may be performed for any number of iterations to determine the lighting samples for the frame.

In further respects, the ray tracing used to generate one or more samples of lighting energy for subsurface scattering may use one or more backside lighting caches to quickly determine energy (e.g., irradiance) for interactions with the backside of an object. To store lighting energy in a backside lighting cache, one or more rays may be cast from a camera and enter an object. One or more interactions of the one or more rays with the object from within the object may be detected. Lighting energy entering the object from locations corresponding to the one or more interactions may then be computed using any suitable approach, such as a ray tracing pass. The one or more values representing the lighting energy, such as one or more irradiance values, may be stored in the backside lighting cache(s) and accessed when simulating subsurface scattering.

The systems and methods described herein may be used for a variety of purposes, by way of example and without limitation, these purposes may include systems or applications for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 depicts an example of a light simulation system 100 (also referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may be implemented using, among other components, a ray caster 102, a sample determiner 104, a resampler 106, and an image renderer 108. As an overview, the image renderer 108 may be configured to render images of environments, such as an environment 200 of FIGS. 2A, 2B, and 2C. To render an image of an environment (e.g., a virtual environment or scene), the image renderer 108 may employ the ray caster 102, the sample determiner 104, and the resampler 106. For example, the image renderer 108 may use those components to implement any of a variety of light transport simulation techniques, such as path tracing, ray tracing, ray marching, etc.

Figure 2A:
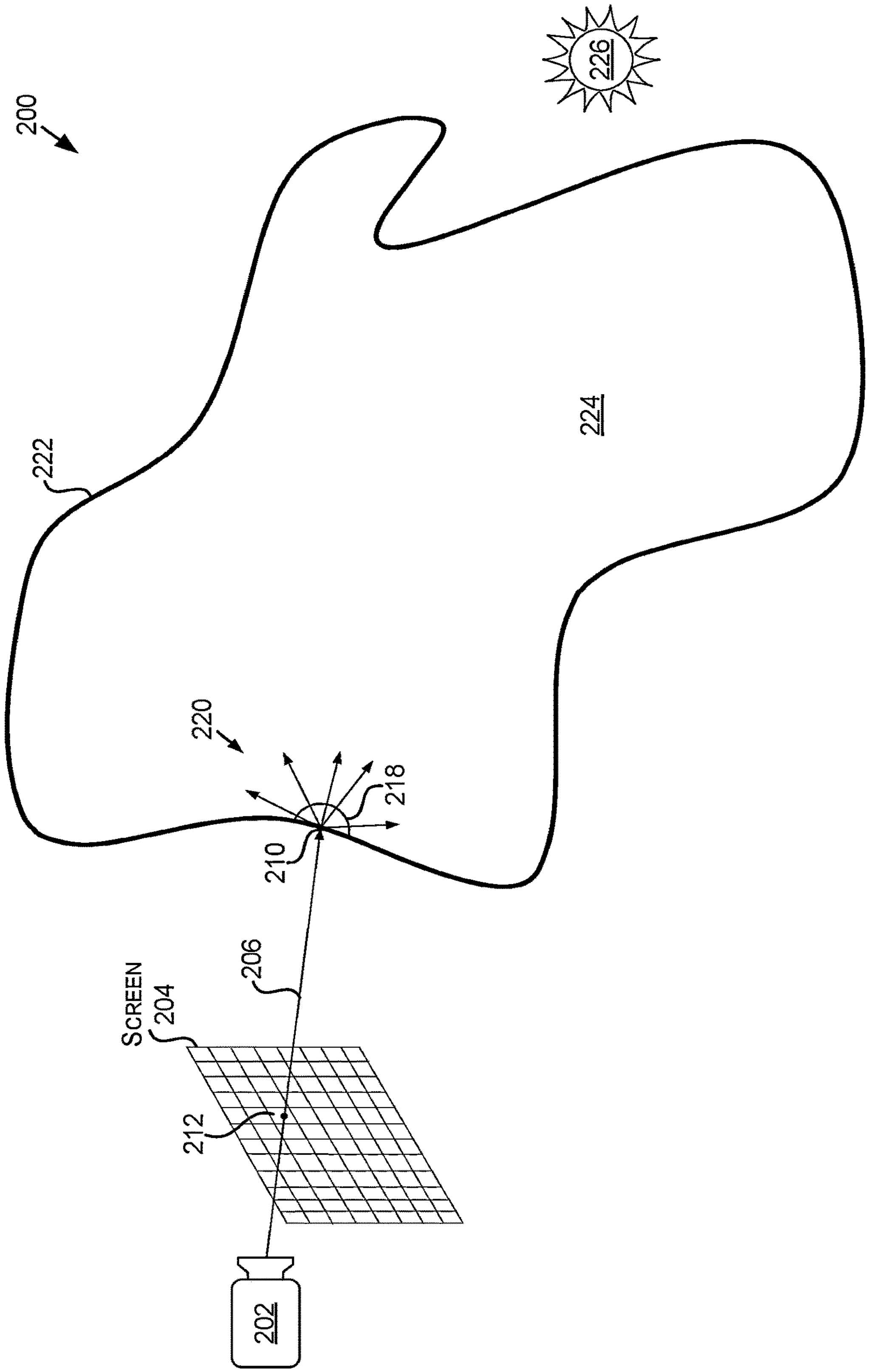
FIG. 2A illustrates examples of directions which may be used to sample lighting scattered within a surface of an object, in accordance with some embodiments of the present disclosure.
Figure 2B:
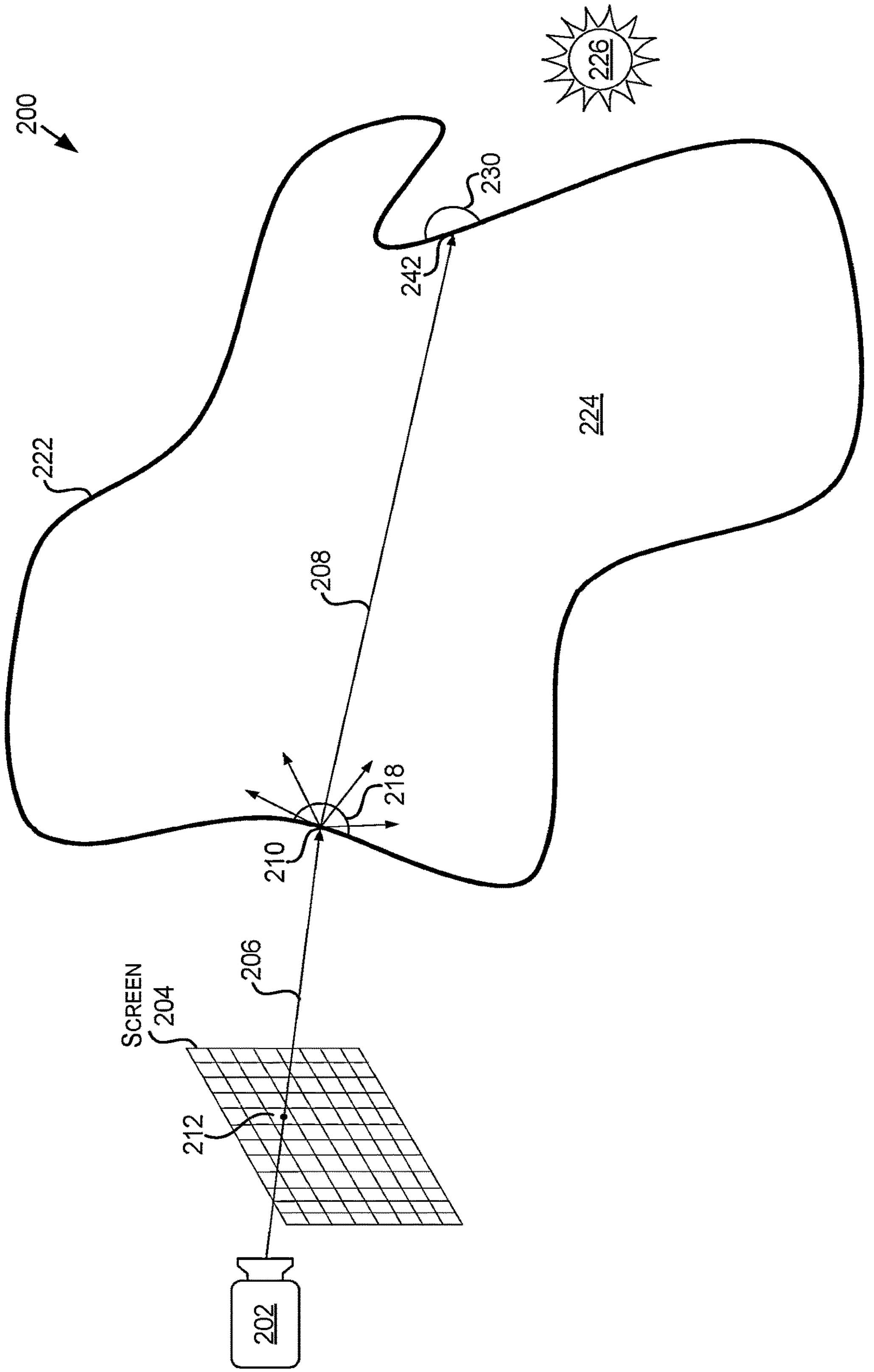
FIG. 2B illustrates an example of lighting at the surface of the object which may be determined for a ray cast in a direction of the directions from FIG. 2A to sample the lighting scattered within the surface of the object, in accordance with some embodiments of the present disclosure.
Figure 2C:
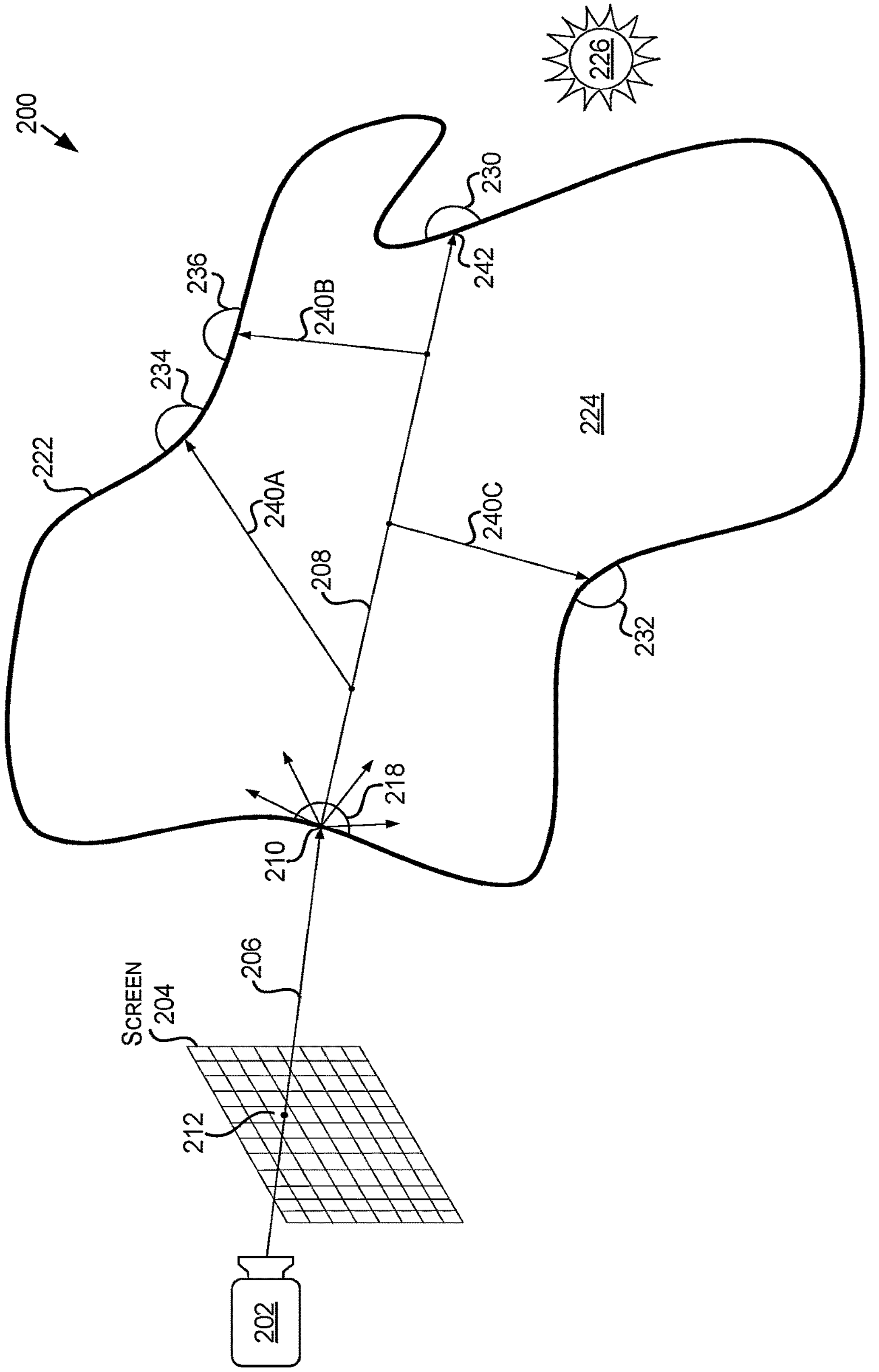
FIG. 2C illustrates an example of lighting at a surface of the object which may be determined for rays scattered from the ray of FIG. 2B to sample the lighting scattered within the surface of the object, in accordance with some embodiments of the present disclosure.

The ray caster 102 may be configured to cast one or more rays (e.g., a ray 206 and/or a ray 208 of FIG. 2C) in an environment (e.g., an environment 200 of FIG. 2C) to sample lighting in the environment (e.g., at the point 210 of FIG. 2C). For example, the ray caster 102 may cast rays from a camera (e.g., a camera 202 of FIG. 2C) and based at least on interactions of the rays with a surface of an object in the environment, cast one or more additional rays to simulate subsurface scattering of the rays within the object. The sample determiner 104 may be configured to determine and/or generate one or more samples of the lighting in the environment based at least on the one or more rays cast using the ray caster 102. For example, the sample determiner 104 may use the rays cast within the object to determine one or more samples of lighting corresponding to the subsurface scattering of the rays within the object. The resampler 106 may be configured to resample the one or more samples determined using the sample determiner 104 (e.g., from one or more reservoirs 112). For example, the resampler 106 may resample the one or more samples based at least on a target function that corresponds to an amount of energy transported to the surface from within the object to generate one or more resampled samples of lighting. The image renderer 108 may be configured to render an image corresponding to the environment based at least on the resampling, such as an image 150 (and in one or more embodiments a diffusion profile 120).

The image 150 may correspond to render data (e.g., samples of aspects of the virtual environment) generated by one or more of the components of the system 100. While the image renderer 108 may be described as rendering the image 150 using the render data, the various examples described herein may use the render data for any suitable computing application, which may or may not include rendering images. For example, one or more samples of lighting energy determined or generated using processes described herein may be used as input to one or more decision making algorithms, which may not necessarily use the data to render an image.

As described herein, the ray caster 102 may be configured to cast one or more rays in an environment to sample lighting in the environment. Referring now to FIG. 2A, FIG. 2A illustrates examples of directions 220 which may be used to sample lighting energy scattered within a surface 222 of an object 224, in accordance with some embodiments of the present disclosure. FIG. 2A shows the environment 200 (a virtual environment) including a camera 202, a screen 204, an object(s) 224, and a light source(s) 226.

The camera 202 may be a virtual camera, such as a viewpoint camera, and may represent a perspective of a viewer of the environment 200 to be rendered using the image renderer 108. The screen 204 may be a virtual representation of a screen which may or may not be the same resolution as the image 150, and/or other images generated in the rendering pipeline (e.g., the resolution may be converted, translated, or cropped). The screen 204 may include a matrix of virtual pixels or regions, of which a pixel 212 is individually labeled.

The image renderer 108 may use a similar or different approach to determining lighting condition data for each pixel of the screen 204 (e.g., path tracing), an example of which is described with respect to the pixel 212. For example, a similar or different approach may be used for another pixel that involves a different light transport path. To determine at least some lighting condition data for the pixel 212 (e.g., corresponding to a pixel of the image 150 of FIG. 1), the image renderer 108 may use the ray caster 102 to determine one or more ray-traced light transport paths through the environment 200. The ray 206 is an example of a ray of such a ray-traced light transport path for the pixel 212. In embodiments that only use one sample per-pixel to render the state of the virtual environment 200, such as to generate the image 150, the light transport path may be the only path cast against the state and/or used to compute the lighting condition data for the pixel 212. Any number of light transport paths may be cast for a pixel and combined to determine the lighting condition data.

The light transport path(s) may be used to sample lighting conditions for the pixel 212. To do so, the ray caster 102 may cast any number of rays (e.g., one or more)—such as the ray 206—through the pixel 212 of the screen 204 to sample lighting conditions for the pixel 212. These rays may be referred to—for example and without limitation—as camera rays, eye rays, incident rays, view vectors, or primary rays, as examples. The ray caster 102 may use the camera rays to determine visible points in the environment 200. For example, the ray caster 102 may use the ray 206 to determine a point 210 on or near the surface 222. This may include the ray caster 102 determining the point 210 as a location where the ray 206 interacts (e.g., intersects) with the surface 222 (or the point 210 may otherwise be based at least in part on that location). Although the ray 206 interacts with the surface 222, in examples where more than one ray is cast, not all rays may interact with a surface, or may interact with a surface of another object (or no object).

From each point or interaction in the environment 200 that the image renderer 108 determines using a ray cast through the pixel 212, any number of rays (e.g., one or more)—such as a ray 208 of FIG. 2B—may be cast to determine the lighting contribution (e.g., irradiance) of the ray 206 at the point 210 or interaction. One or more of these rays may be cast to simulate subsurface scattering within the object corresponding to the interaction. For example, subsurface scattering may be simulated to determine lighting data (e.g., representing lighting 218, such as irradiance) for the point 210 or interaction, which may form at least part of the lighting contribution for the pixel 212.

To simulate subsurface scattering, the image renderer 108 may determine a direction of the directions 220 for the ray 208 and/or other rays based at least on sampling a distribution function. The distribution function may define a direction of one or more rays scattered from a location (e.g., the point 210) corresponding to the surface 222 of the object 224. In one or more embodiments, the distribution function may be sampled using a stochastic sampling strategy, such as, for example and without limitation, a Monte Carlo or a quasi-Monte Carlo sampling strategy.

In one or more embodiments, the sampling strategy and direction are based at least in part on a normal of the surface 222 at the point 210. For example, the ray caster 102 may define a Normal Distribution Function (NDF) range for the point 210 based at least in part on the normal of the surface 222 at the point 210. The ray caster 102 may use the NDF and the ray 206 (and in some examples a roughness value of the surface 222 that is associated with the point 210 and/or other material properties) to define the distribution function. For example, the distribution function may include a bidirectional scattering distribution function (BSDF). The ray caster 102 may sample the distribution function (e.g., stochastically or using another sampling strategy) to determine the direction in which to cast the ray 208 of FIG. 2B.

Referring now to FIG. 2B, FIG. 2B illustrates an example of lighting 230 at the surface 222 of the object 224 which may be determined for the ray 208 cast in a direction of the directions 220 from FIG. 2A to sample the lighting 218 scattered within the surface 222 of the object 224, in accordance with some embodiments of the present disclosure. The lighting 230 (e.g., irradiance) may correspond to light energy from the light source 226 that enters the surface 222 of the object 224 (a backside of the object 224 at a point 242, or interaction) and reaches the point 210 to contribute to the lighting 218.

In one or more embodiments, the ray caster 102 may use the ray 208 to determine a point 242 on or near the surface 222. Similar to the point 210, this may include the ray caster 102 determining the point 242 as a location where the ray 208 interacts (e.g., intersects) with the surface 222.

The ray caster 102 may, similar to the interaction at the point 210, cast any number of rays (e.g., one or more) from the point 242 to sample the lighting 230 (e.g., incident radiance or irradiance) for the ray 208 at the point 242 (e.g., using stochastic sampling). This process may continue for each interaction, until a light transport path is formed between the camera 202 and a light source, such as the light source 226. In addition or as an alternative, one or more other approaches may be used to determine at least a portion of the lighting 230. In one or more embodiments, based at least on detecting the interaction corresponding to the point 242, the ray caster 102 may use the sample determiner 104 to determine the lighting using the lighting cache(s) 110 (e.g., an irradiance cache(s)). For example, the lighting cache 110 may store one or more values corresponding to lighting energy, which the ray caster 102 may associate with the point 242 (e.g., based on a location of the point 242).

Referring now to FIG. 2C, FIG. 2C illustrates an example of lighting 232, 234, and 236 at the surface 222 of the object 224 which may be determined for rays 240A, 240B, and 240C scattered from the ray 208 of FIG. 2B to sample the lighting 218 scattered within the surface 222 of the object 224, in accordance with some embodiments of the present disclosure. The ray caster 102 may scatter any number of rays (e.g., one or more) from the ray 208 to sample the contribution of the ray 208 to the lighting 218. The lighting 232, 234, and 236 (e.g., irradiance) may be determined using similar or different approaches as used to determine the lighting 230 (e.g., for corresponding points and/or interactions). For example, based at least on detecting the interactions, the ray caster 102 may determine the lighting using the lighting cache(s) 110 (e.g., an irradiance cache).

In one or more embodiments, lighting due to subsurface scattering may be defined using path tracing in accordance with Equation (1):

$$L(x,\omega)=\int_{t=0}^{d}T(t)[\sigma_a(x)L_e(x_t,\omega)+\sigma_s(x)L_s(x_t,\omega)]dt+T(d)L_d(x_d,\omega) \tag{1}$$

where d may refer to the distance of the path integral being evaluated for samples t, x may refer to a vertex or point for which lighting is being evaluated, and ω may refer to a ray direction. As shown in Equation (1), the integral includes $\sigma_\alpha(x)L_e(x_t,\omega)$, which may be referred to as an absorption term, and $\sigma_s(x)L_s(x_t,\omega)$, which may be referred to as a scattering term. The absorption term may correspond to the amount of light absorbed by the object 224. The scattering term may correspond to the amount of light from scattering within the object 224. For example, the scattering term may be evaluated using approaches described with respect to FIG. 2C. The non-integral portion of Equation (1) includes $T(d)L_d(x_d,\omega)$, which may be referred to as the boundary term. The boundary term may correspond to the amount of energy received from light entering the object 224. For example, the boundary term may be solved using approaches described with respect to FIG. 2B.

As described herein, to simulate subsurface scattering, the image renderer 108 may determine one or more samples of the lighting for the point 210 based at least on sampling the distribution function. Each sample may correspond to a respective direction of the directions 220 and may be evaluated in accordance with Equation (1) to determine lighting from subsurface scattering at an interaction (e.g., corresponding to the point 210). Generally, the accuracy of the lighting the image renderer 108 computes may increase with the number of rays used to sample the lighting conditions. However, the computing resources used to determine the lighting conditions also may increase with the number of rays, which may increase render times. As the number of samples increase, the computational resources required to render such a scene may impose too great of a delay for real-time rendering applications, such as gaming.

To preserve computing resources and to reduce render times, the number of rays cast to sample lighting for subsurface scattering may be reduced, which may lead to an inaccurate ray-traced result. For example, this may result in the image renderer 108 generating noisy lighting condition data, which can be improved using denoising filters, but may ultimately be limited by the quality of the samples.

In accordance with one or more embodiments of the disclosure, when determining lighting for subsurface scattering for an interaction(s), one or more samples may be generated using ray tracing. The one or more samples may then be resampled to generate one or more resampled samples of lighting (e.g., irradiance) for the interaction(s). The resampled samples may then be used by the image renderer 108 as the lighting for the interaction(s). Using disclosed approaches, the resampled samples may be of higher quality than the initial ray-traced sample(s). Thus, fewer samples may be needed for the image renderer 108 to produce an accurate ray-traced result. In at least one embodiment, the samples may be resampled using Reservoir-based Spatio-Temporal Importance Resampling (ReSTIR), however other approaches may be used.

In at least one embodiment, the resampling may use a target function that corresponds to an amount of energy transported to the interaction(s) from within the object to generate one or more resampled samples of irradiance. For example, the target function for the point 210 may correspond to an amount of energy transported to the point 210 from within the object 224. In one or more embodiments, the target function may correspond to an amount of energy that enters the object 224 from one or more light sources and reaches the point 210. The lighting 230 may be an example of a sample of the target function.

In at least one embodiment, the target function may correspond to one or more terms and/or one or more parameters of a lighting equation used to solve for lighting for the interaction. For example, the target function may correspond to the boundary term of the Equation (1) and include one or more factors associated with the boundary term.

As an example, the target function may include one or more variables corresponding to (e.g., representing) a distance between a first location corresponding to the first interaction and a second location corresponding to a second interaction of the one or more rays with the surface. For example, the one or more variables may correspond to (e.g., represent) a scattering distance t for the point 210, an example of which includes a distance of the ray 208.

Additionally, or alternatively, the target function may include one or more variables corresponding to (e.g., representing) lighting (e.g., irradiance) corresponding to the second location. For example, the one or more variables may correspond to (e.g., represent) radiance R for the point 242, an example of which includes the lighting 230.

Additionally, or alternatively, the target function may include one or more variables corresponding to (e.g., representing) one or more material properties associated with the object. For example, the one or more variables may correspond to (e.g., represent) material properties $\sigma_t$ for the object 242, an example of which includes one or more scattering coefficients and one or more absorption coefficients associated with the object 224.

The lighting 218 for the interaction may be highly dependent on the scattering distance t, the radiance R for the point 242, and the material properties $\sigma_t$ for the object 242, making these particularly useful factors for inclusion in the target function.

In one or more embodiments, the target function may be an analytical function, an example of which may include an analytical formulation of the boundary term of Equation (1). For example, the boundary term may be solved analytically in accordance with Equation (2):

$$R*\exp(-\sigma_t*t). \tag{2}$$

In accordance with aspects of the present disclosure, the one or more samples may resampled using resampled importance sampling (RIS). In one or more embodiments, the one or more samples may be generated by the sample determined 104 using a source distribution function. The source distribution function (e.g., a probability distribution function) may be a uniform distribution, a cosine-weighted distribution function, and/or a distribution based at least in part on the BSDF at the point corresponding to the interaction with the object (e.g., the point 210), such as the distribution function used to define a direction of one or more rays scattered from a location (e.g., the point 210) corresponding to the surface 222 of the object 224, then resampled using the target function, as described herein.

For example, the one or more samples M of lighting of samples y=y1, . . . , yM for an interaction may be sampled from a source distribution function p(y). In one or more embodiments, for each pixel and/or interaction, the sample(s) may be read from a sample buffer, then used to update one or more sets of temporal samples, and/or spatial samples. By way of example, and not limitation, each set of samples may correspond to a respective reservoir, which may be stored in a reservoir buffer(s) (e.g., one or more screen-space buffers). In at least one embodiment, each pixel and/or other designated location may have one or more of its own reservoirs 112. As used herein, a reservoir may refer to a fixed-size data structure. In at least one embodiment, a reservoir 112 for a pixel and/or location may only store one or more accepted samples, which may refer to resampled samples and/or samples used to define lighting for one or more pixels and/or locations (e.g., in the image 150). While reservoirs are described herein, examples and description involving one or more samples from reservoirs more generally apply to sets of one or more samples, which need not be stored using reservoirs.

One or more reservoirs 112 for one or more pixels may be associated with the interaction for use in the resampling. For example, at least one of the reservoirs 112 for a pixel(s) may be used for an interaction(s) based at least on spatially and/or temporally associating the pixel(s) with the interaction. In at least one embodiment, a spatial reservoir may include a reservoir of one or more samples associated with the interaction for a current state of the environment (e.g., for a current frame). The resampler 106 may select one or more spatial reservoirs of one or more pixels for resampling the interaction based at least on the interaction corresponding to lighting for the one or more pixels in the current frame. For example, a spatial reservoir for the pixel 212 may be used for resampling lighting corresponding to the point 210. Additionally or alternatively, a temporal reservoir may include a reservoir of one or more samples associated with the interaction for one or more previous states of the environment (e.g., for a current frame), for example, using temporal reprojection.

In one or more embodiments, at least one of the reservoirs 112 for one or more other pixel may be used for the interaction(s) based at least on a proximity (e.g., in screen-space) of the one or more other pixel to the pixel(s) corresponding to the interaction. By way of example, and not limitation, the reservoirs 112 used for the interaction may define a region, such as an N×N region centered around a pixel associated with the interaction, where N refers to the number of pixels in the region along a particular dimension. As a specific example, a 3×3 region may be used, which includes 9 pixels and 9 spatial and/or 9 temporal reservoirs for corresponding pixels in the region. One or more of these reservoirs 112 may be selected from the region for use in resampling.

In at least one embodiment, resampling one or more samples for an interaction may include updating the one or more reservoirs 112 of samples that are associated with the interaction, where the one or more samples are used to generate one or more updated reservoirs 112 of samples. For example, each selected reservoir 112 may be updated using one or more update rules. An example of an update rule for a reservoir 112 includes drawing the samples in the reservoir 112 after the update from the distribution of the target function. In one or more embodiments, the reservoir 112 may be updated in accordance with weighted reservoir sampling (WRS), which is a family of algorithms for sampling N random elements from a stream in a single pass over the data, where each element has an associated weight w.

By way of example, and not limitation, the target function p may be used to resample one or more samples z from y with a sample's relative weight being given in accordance with Equation (3):

$$w(y) = \frac{\hat{p}(y)}{p(y)}, \tag{3}$$

However, any suitable weighting may be used.

Having updated the reservoir(s) 112 for an interaction, based at least on the target function, the resampler 106 may sample (e.g., randomly) from the updated reservoir(s) 112, where the resultant sample(ss) may be referred to as a resampled sample(s).

Where multiple reservoirs 112 and/or sets of one or more samples are updated, such as one or more temporal and/or spatial reservoirs, the resampler 106 may be configured to merge the reservoirs 112 to generate the one or more resampled samples, yielding one or more resampled samples drawn from the candidate samples considered by each reservoir 112. The resampled samples may then be used by the image renderer 108 as the lighting for the interaction.

In one or more embodiments, the resampling may be performed using any number of iterations of updating the selected reservoir(s) 112 and selecting one or more resampled samples from the updated reservoir(s) 112. For example, for an initial iteration, the selected reservoir(s) 112 may be updated using the one or more samples generated using ray tracing. In each subsequent iteration, the updated reservoir(s) 112 may again be updated using the one or more resampled samples generated using the previous iteration. The resampled sample(s) resulting from the one or more iterations may then be used by the image renderer 108 as the lighting for the interaction. Using this approach may provide higher quality resampled samples when fewer samples are generated using computationally expensive techniques, such as ray tracing techniques. Thus, the processing resources used to generate the samples may be reduced while maintaining high quality resampled samples.

While particular resampling approaches, such as ReSTIR, have been described herein, various approaches may be used. In one or more embodiments, the one or more samples may be used to evolve the one or more sets of samples from a first distribution corresponding to the source distribution function (e.g., a bidirectional scattering distribution function) to a second distribution corresponding to the target function over a plurality of frames. ReSTIR, and other such functions, may generally use the one or more samples and the target function to filter sets of samples from one or more sources or otherwise select or derive one or more higher quality samples for rendering (which may also involve iteratively improving the quality of the sets of samples). While reservoirs or sets of samples have been described, in or more embodiments, disclosed approaches may still provide higher quality samples without necessarily using the sets of samples and/or reservoirs (e.g., by evolving one or more samples from the source function to the target function).

In at least one embodiment, in order to reduce processing requirements, the lighting for the subsurface scattering of the interactions at the surface of the object 224 may represent lighting due to single scattering transmission. Single scattering transmission may refer to light that enters the object 224, bounces once, then leaves the object 224. Lighting from subsurface scattering for curved features of an object may be dominated by single scattering transmission, allowing for lighting for these features to be more accurately modeled. In at least one embodiment, the image renderer 108 may combine the lighting from single scattering transmission computed for the interactions and/or corresponding pixels with additional lighting information corresponding to at least some multibounce scattering transmission to determine the lighting for the interaction and/or pixel.

By way of example, and not limitation, lighting corresponding to the multibounce scattering transmission may be provided using pre-integrated and/or pre-computed lighting information. For example, the diffusion profile 120, such as a Burley profile, may be used to provide the additional lighting information based at least on approximating the lighting in a defined area around the intersection. A typical diffusion profile does not account for the boundary term, which can be a critical component of lighting for certain areas of an object, such as curved features. However, the typical diffusion profile includes at least some of the energy computed for single scattering transmission. As such, the diffusion profile 120 may be generated so that it does not include at least a portion of the single scattering transmission. This may involve introducing additional assumptions into the scattering and performing additional computations for the curve fit. In at least one embodiment, one or more other approaches may be used to add lighting corresponding to at least some multibounce scattering transmission.

Figure 3:
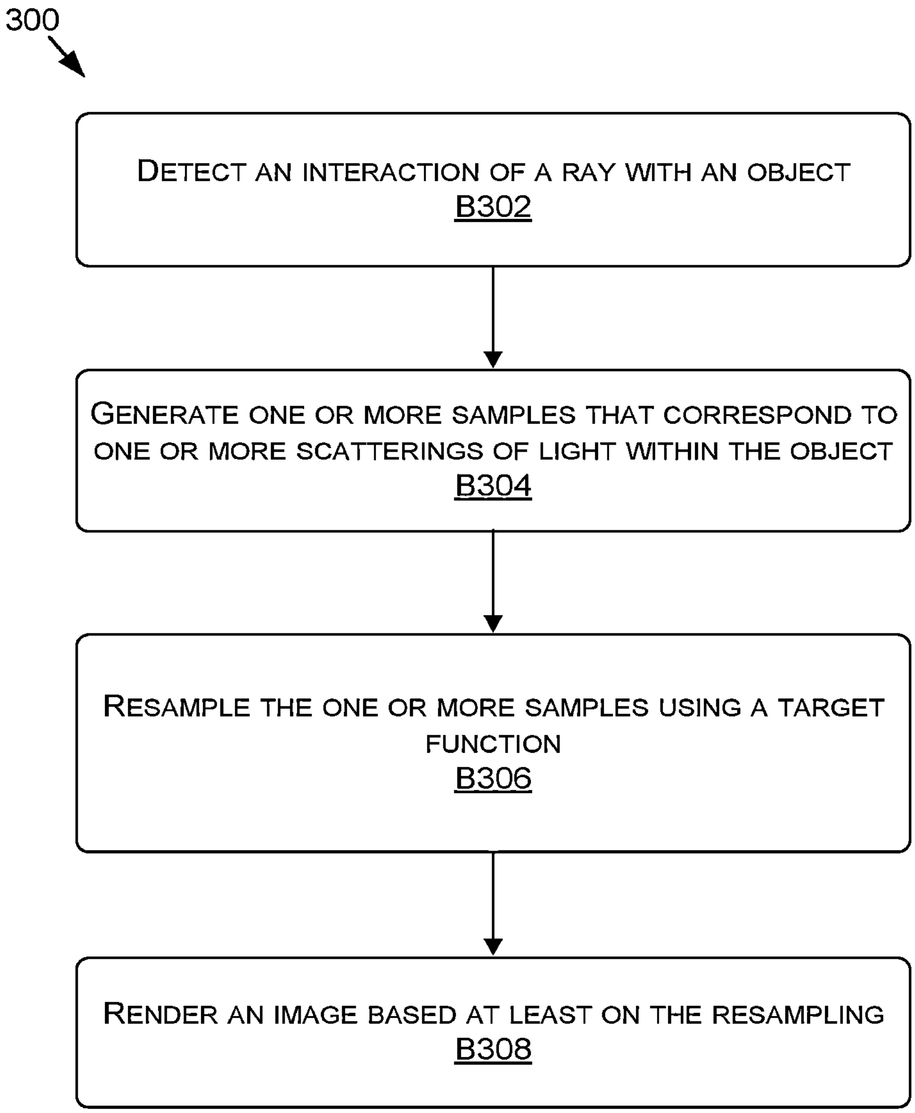
FIG. 3 is a flow diagram showing a method for evaluating a subsurface scattering of lighting within an object based at least on resampling one or more samples, in accordance with some embodiments of the present disclosure.
Figure 4:
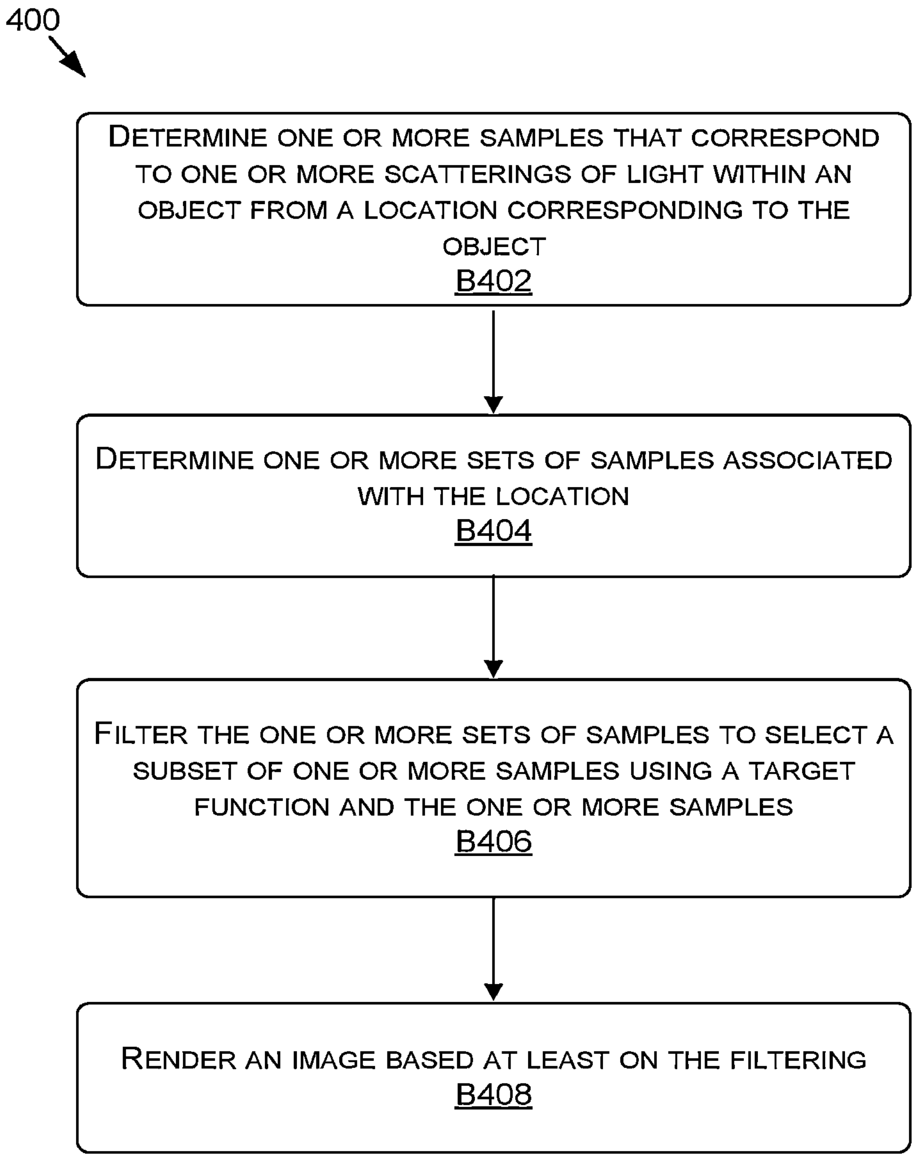
FIG. 4 is a flow diagram showing a method for evaluating a subsurface scattering of lighting within an object based at least on filtering one or more sets of samples, in accordance with some embodiments of the present disclosure.

Now referring to FIGS. 3-4, each block of methods 300, 400, and other methods described herein, comprises a computing process that may be performed using any combination of hardware, firmware, and/or software. For instance, various functions may be carried out by a processor executing instructions stored in memory. Methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to particular figures. However, methods 300 and 400 may additionally or alternatively be executed by any one system, or any combination of systems, including, but not limited to, those described herein.

With reference to FIG. 3, FIG. 3 is a flow diagram showing a method 300 for evaluating a subsurface scattering of lighting within an object based at least on resampling one or more samples, in accordance with some embodiments of the present disclosure. The method 300, at block B302, includes detecting an interaction of a ray with an object. For example, the ray caster 102 may detect an interaction of the ray 206 with the object 224 in the environment 200. The interaction may correspond to the point 210 on the surface 222 of the object 224.

At block B304, the method 300 includes generating one or more samples that correspond to one or more scatterings of light within the object. For example, the sample determiner 104 may generate one or more samples of irradiance that correspond to one or more scatterings of light within the object 224 based at least on the interaction.

At block B306, the method 300 includes resampling the one or more samples using a target function. For example, the resampler 106 may resample the one or more samples of irradiance using a target function that corresponds to an amount of energy transported to the interaction from within the object 224 to generate one or more resampled samples of irradiance.

At block B308, the method 300 includes rendering an image based at least on the resampling. For example, the image renderer 108 may render the image 150 corresponding to the environment 200 based at least on the resampling of the one or more samples.

Referring now to FIG. 4, FIG. 4 is a flow diagram showing a method 400 for evaluating a subsurface scattering of lighting within an object based at least on filtering one or more sets of samples, in accordance with some embodiments of the present disclosure. The method 400, at block B402, includes determining one or more samples that correspond to one or more scatterings of light within an object from a location corresponding to the object. For example, the sample determiner 104 may determine one or more samples of lighting that correspond to one or more scatterings of light within the object 224 from the point 210 corresponding to the object 224.

At block B404, the method 400 includes determining one or more sets of samples associated with the location. For example, the resampler 106 may determine one or more sets of samples of lighting (e.g., one or more reservoirs 112) associated with the point 210.

At block B406, the method 400 includes filtering the one or more sets of samples to select a subset of one or more samples using a target function and the one or more samples. For example, the resampler 106 may use the target function to update the one or more sets of samples using the one or more samples and select one or more samples from the updated one or more sets of samples.

At block B408, the method 400 includes rendering an image based at least on the filtering. For example, the image renderer 108 may render the image 150 corresponding to the environment 200 based at least on the resampling of the one or more samples.

Frontside and Backside Lighting Caches

As described herein, the sample determiner 104 may determine lighting using the lighting cache(s) 110 (e.g., an irradiance cache). For example, the lighting cache 110 may store one or more values corresponding to lighting, which the ray caster 102 may associate with the point 242 (e.g., based on a location of the point 242). The lighting cache(s) 110 may include one or more of a frontside lighting cache and/or a backside lighting cache. The frontside lighting cache may store one or more values of lighting (e.g., irradiance values) corresponding to the frontside of one or more objects in the environment 200, such as the object 224, with respect to the camera 202.

In contrast, the backside lighting cache may store one or more values of lighting (e.g., irradiance) corresponding to the backside of one or more objects in the environment 200, such as the object 224, with respect to the camera 202. In one or more embodiments, each lighting cache may be a respective screen-space cache where one or more values are stored per pixel. However, the lighting caches may take different forms and need not be screen-space caches (e.g., using respective g-buffers). One or more of the lighting caches may be updated each frame.

Figure 5A:
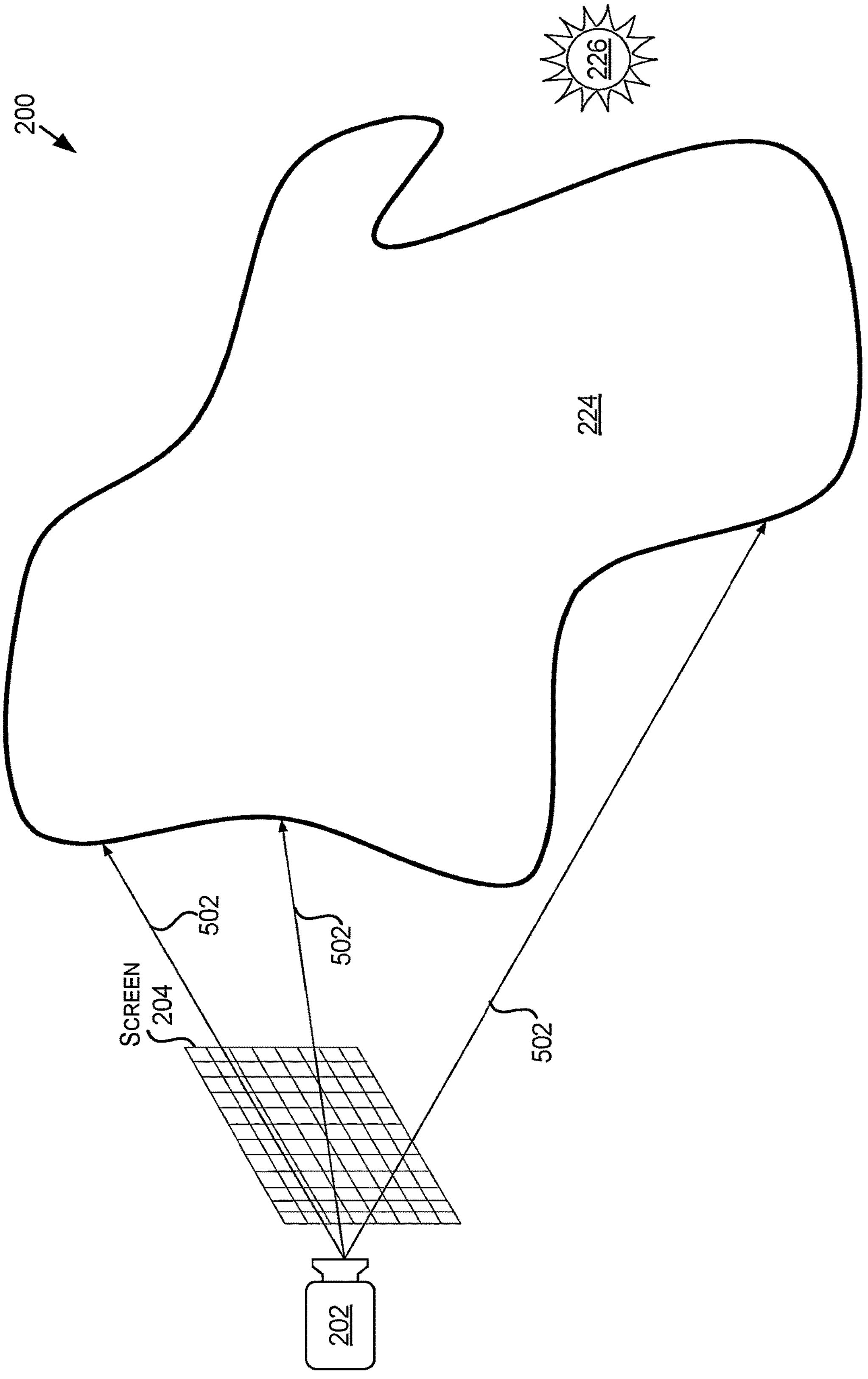
FIG. 5A illustrates an example of detecting external interactions of rays cast from a camera with an object to update a frontside lighting cache, in accordance with some embodiments of the present disclosure.

Referring now to FIG. 5A, FIG. 5A illustrates an example of detecting external interactions of rays 502 cast from the camera 202 with the object 224 to update a frontside lighting cache of the lighting caches 110, in accordance with some embodiments of the present disclosure. In at least one embodiment, the ray caster 102 may cast one or more rays 502 through the screen 204 (e.g., one or more rays per-pixel) and detect one or more external interactions of the rays 502 with one or more objects, such as the object 224, as shown. Based at least on the external interactions corresponding to the frontside of the object(s) (e.g., first hits of primary rays), one or more energy values (e.g., of irradiance) may be determined for the external interactions and stored in the frontside lighting cache(s).

Figure 5B:
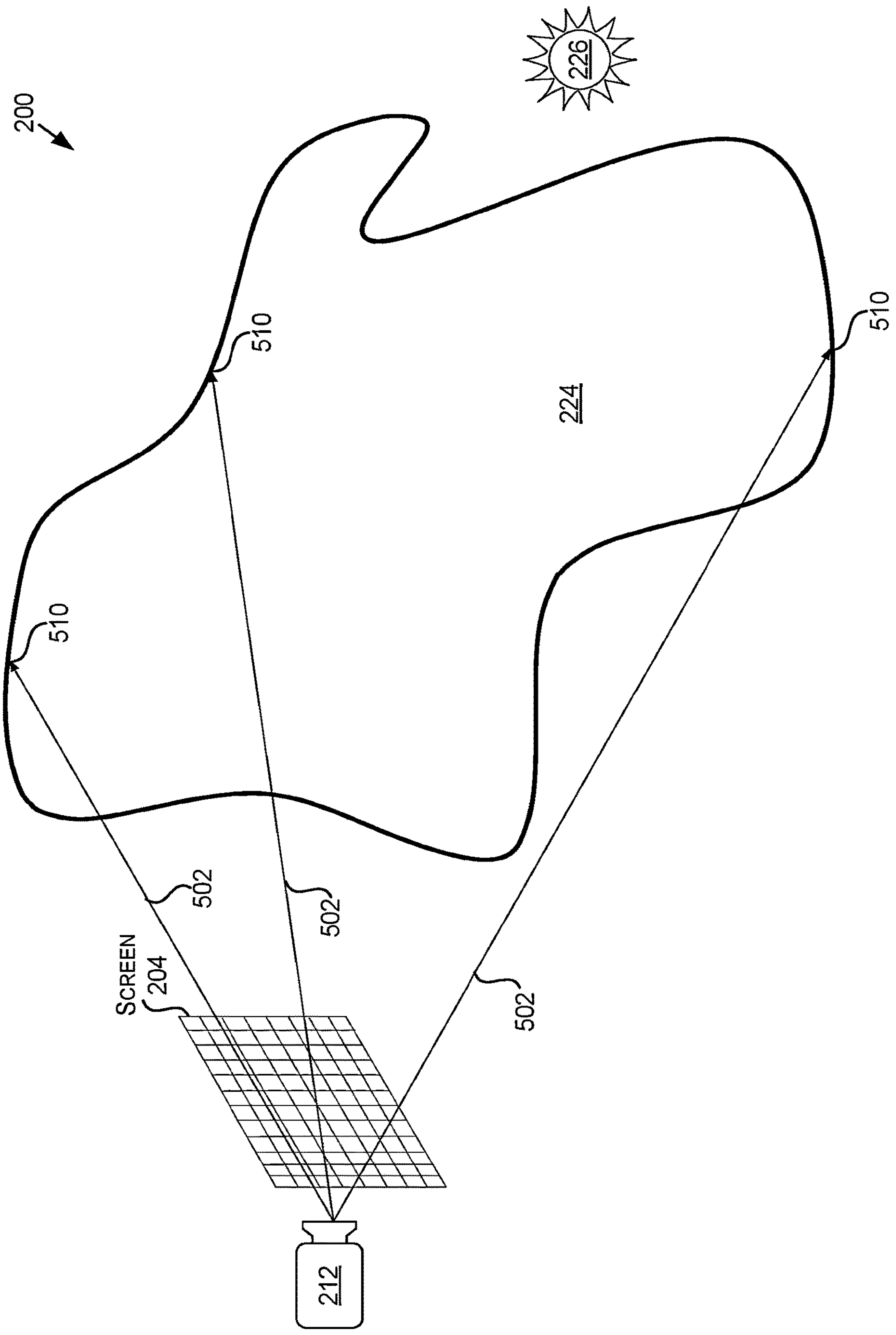
FIG. 5B illustrates an example of detecting internal interactions of rays cast from a camera with the object of FIG. 5A to update a backside lighting cache, in accordance with some embodiments of the present disclosure.

Referring now to FIG. 5B, FIG. 5B illustrates an example of detecting internal interactions of rays 502 cast from the camera 202 with the object 224 of FIG. 5A to update a backside lighting cache of the lighting caches 110, in accordance with some embodiments of the present disclosure. In at least one embodiment, the ray caster 102 may extend the one or more rays 502 through the surface 222 of the object 224 and detect one or more internal interactions of the rays 502 within the one or more objects, such as the object 224, as shown. Based at least on the internal interactions corresponding to the backside of the object(s) (e.g., subsequent hits of primary rays), one or more energy values (e.g., of irradiance) may be determined for the internal interactions and stored in the backside lighting cache(s). For example, the lighting for each interaction may correspond to lighting entering the object at a location of the interaction.

The lighting for the frontside and backside lighting caches may be determined using any suitable technique, such as performing ray tracing with respect to the corresponding frontside and/or backside interactions to determine lighting at those locations. In at least one embodiment, backside lighting may be determined using an additional lighting pass. Processing resources may be preserved by performing the lighting pass at a lower resolution than what is used to for the frontside lighting pass (e.g., which may be determined using the approach of FIGS. 2A-2C for the subsurface scattering components) and/or limiting the lighting evaluation to geometry associated with subsurface scattering (e.g., based on the material properties of the objects and/or translucency of the objects).

Typical approaches to implementing irradiance caches compute lighting for what is visible to the camera 202, which is the frontside of objects in the environment 200. The frontside irradiance cache(s) may be determined and used similar to these approaches. For example, the frontside irradiance cache(s) may store visible lighting the image renderer 108 uses to render the image 150.

The lighting from the backside lighting cache(s) may be used to determine lighting for external interactions of rays of objects from subsurface scattering within the objects. For example, as described herein, to determine the lighting from subsurface scattering for the interaction corresponding to the point 210, the sample determiner 104 may access one or more values from the backside lighting cache associated with the point 242 to determine the lighting 230 for the corresponding interaction of the ray 208. Associating the interaction with a sample(s) in the backside lighting cache may include, for example, projecting the location to screen-space (e.g., to the screen 204) to determine a pixel corresponding to the interaction, and using one or more values in the cache that correspond to the pixel. In one or more embodiments, elements (e.g., pixels) of the cache may correspond to one or more locations in screen or world-space, and the interaction may use values for one or more elements based on the proximity of the interaction to the locations of the elements (in screen or world-space).

Thus, the lighting 230 need not be computed on-demand when evaluating sub-surface scattering. When implementing a backside lighting cache(s), the lighting due to subsurface scattering may be computed using any suitable approach including those described herein. Although shown as the same rays 502, in one or more embodiments, the rays 502 used to detect the interactions for the frontside lighting cache(s) may be the same or different than the rays used to detect the interactions for the backside lighting cache(s). Similarly, the primary rays described with respect to FIGS. 2A-2C may be the same or different than the rays used to detect the interactions for the frontside and/or backside lighting cache(s).

Figure 5C:
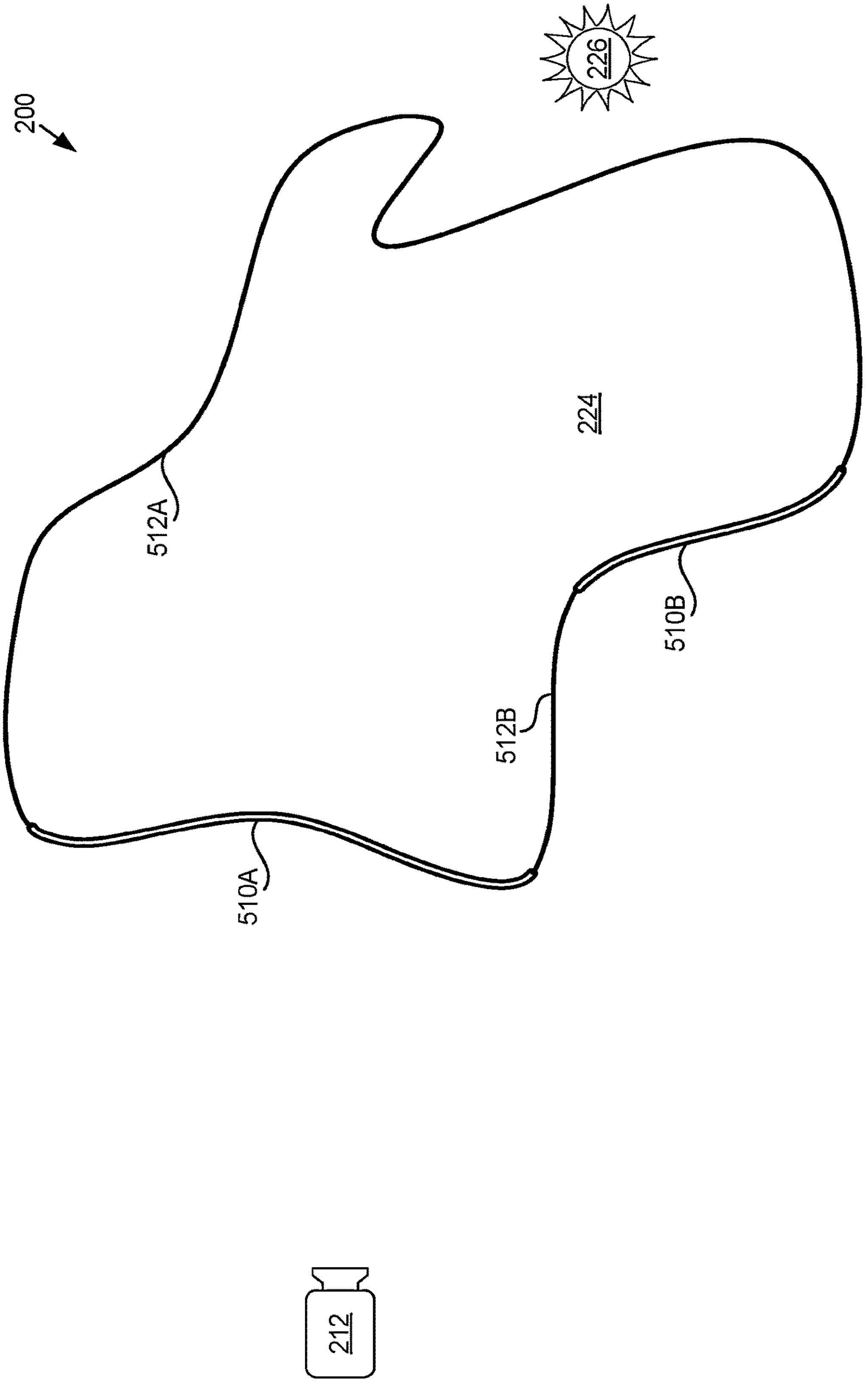
FIG. 5C illustrates an example of locations on a surface of the object of FIGS. 5A and 5B which may correspond to a frontside light cache and a backside lighting cache, in accordance with some embodiments of the present disclosure.

Referring now to FIG. 5C, FIG. 5C illustrates an example of locations on the surface 222 of the object 224 of FIGS. 5A and 5B which may correspond to a frontside light cache and a backside lighting cache, in accordance with some embodiments of the present disclosure. In particular, FIG. 5C shows locations 510A and 510B, which may correspond to a frontside lighting cache. FIG. 5C also shows locations 512A and 512B, which may correspond to a backside lighting cache.

Figure 6:
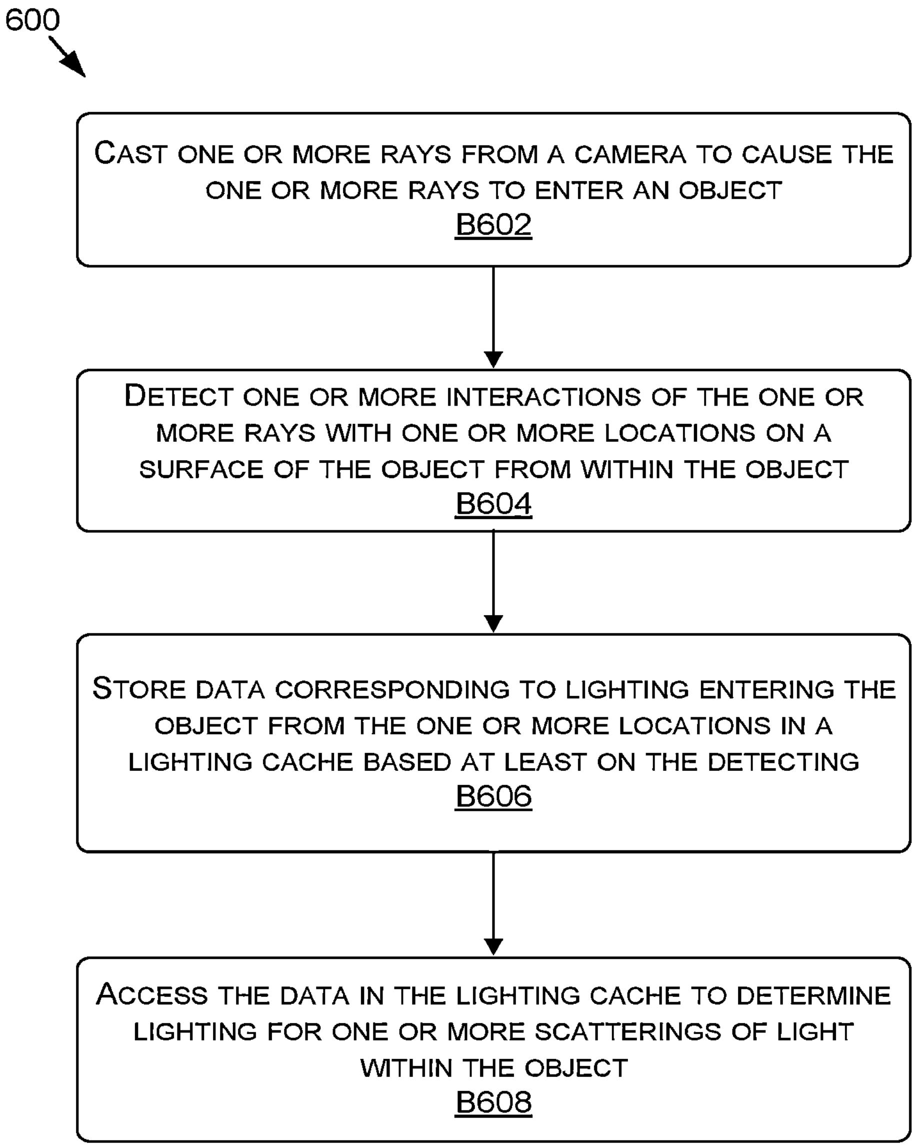
FIG. 6 is a flow diagram showing a method for storing lighting data in one or more lighting caches, in accordance with some embodiments of the present disclosure.

Referring now to FIG. 6, each block of method 600, and other methods described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 600 is described, by way of example, with respect to particular figures. However, the method 600 may additionally or alternatively be executed by any one system, or any combination of systems, including, but not limited to, those described herein.

FIG. 6 is a flow diagram showing a method 600 for storing lighting data in one or more lighting caches, in accordance with some embodiments of the present disclosure. The method 600, at block B602, includes casting one or more rays from a camera to cause the one or more rays to enter an object. For example, the ray caster 102 may cast the rays 502 to cause the rays 502 to enter the object 224.

At block B604, the method 600 includes detecting one or more interactions of the one or more rays with one or more locations on a surface of the object from within the object. For example, the ray caster 102 may detect interactions of the rays 502 with locations 510 on the surface 222 of the object 224 from within the object 224, as indicated in FIG. 5B.

At block B606, the method 600 includes storing data corresponding to lighting entering the object from the one or more locations in one or more lighting caches based at least on the detecting. For example, the sample determiner 104 may store data corresponding to lighting entering the object 224 from the locations 510 in one or more lighting caches 110 based at least on detecting the interactions. In at least one embodiment, the ray caster 102 may cast one or more rays to determine the lighting stored in the one or more lighting caches 110 based at least on the detecting of the interactions.

At block B608, the method 600 includes accessing the data in the one or more lighting caches to determine lighting for one or more scatterings of light within the object. For example, the sample determiner 104 may access the lighting cache(s) 110 to determine lighting for subsurface scattering for the point 210, in FIGS. 2A through 2C.

Example Parallel Processing Architecture

Figure 7:
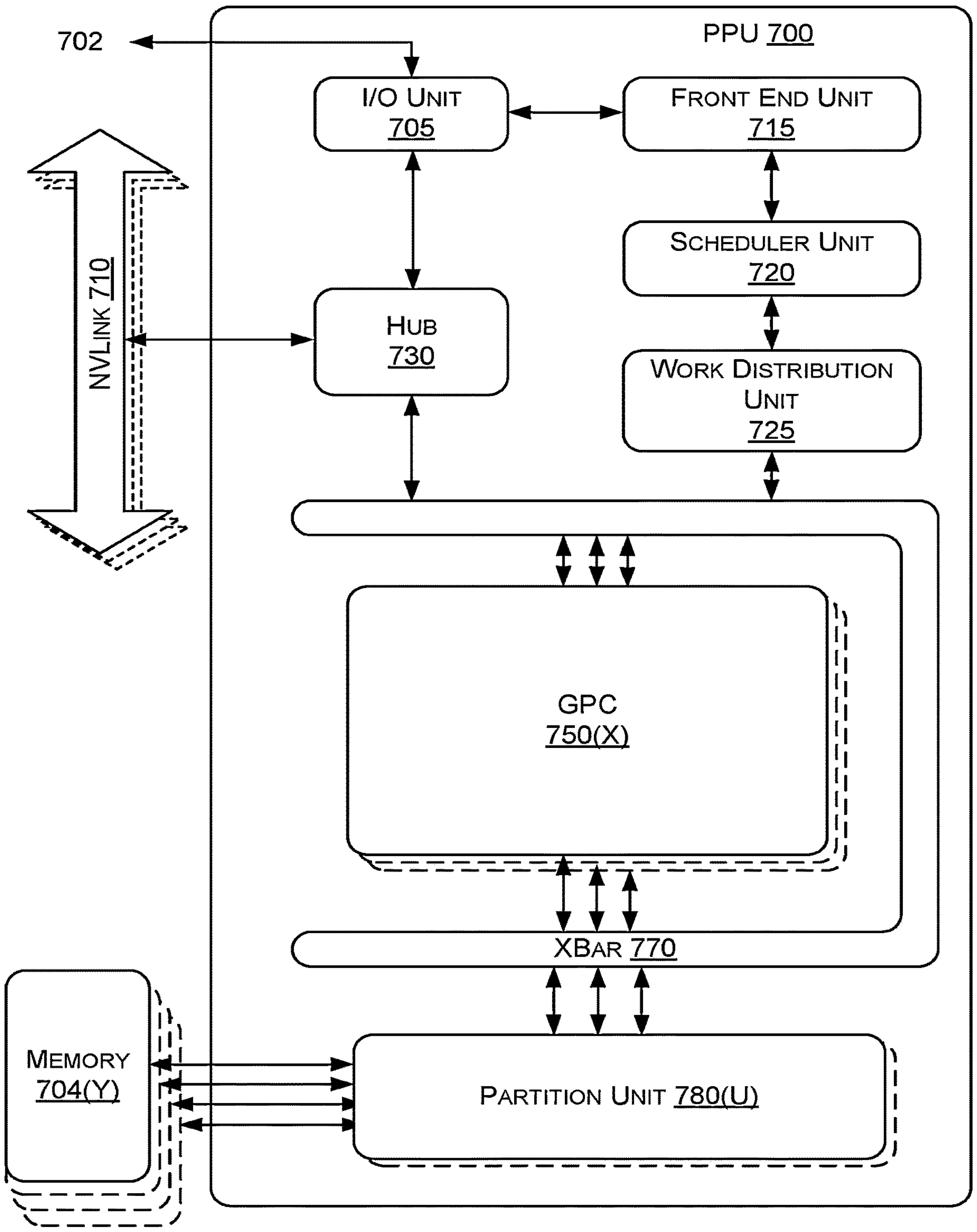
FIG. 7 illustrates an example parallel processing unit suitable for use in implementing at least some embodiments of the present disclosure.

FIG. 7 illustrates an example parallel processing unit (PPU) 700 suitable for use in implementing at least some embodiments of the present disclosure. In at least one embodiment, the PPU 700 is a multi-threaded processor that is implemented on one or more integrated circuit devices. The PPU 700 may have a latency hiding architecture designed to process many threads in parallel. A thread (e.g., a thread of execution) may refer to an instantiation of a set of instructions configured to be executed by the PPU 700. In at least one embodiment, the PPU 700 is a graphics processing unit (GPU) configured to implement a graphics rendering pipeline for processing three-dimensional (3D) graphics data in order to generate two-dimensional (2D) image data for display on a display device such as a liquid crystal display (LCD) device. In one or more embodiments, the PPU 700 may be used for performing general-purpose computations. While one parallel processor is provided herein for illustrative purposes, it should be noted that such processor is set forth for illustrative purposes only, and that any processor may be employed to supplement and/or substitute for the same.

One or more PPUs 700 may be configured to accelerate, by way of example and not limitation, thousands of High-Performance Computing (HPC), data center, and machine learning applications. The PPU 700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, light transport simulation, astronomy, molecular dynamics simulation, financial modeling, robotics, digital twinning, synthetic data generation, factory automation, real-time language translation, online search optimizations, personalized user recommendations, and the like.

As shown in FIG. 7, the PPU 700 includes an Input/Output (I/O) unit 705, a front end unit 715, a scheduler unit 720, a work distribution unit 725, a hub 730, a crossbar (Xbar) 770, one or more general processing clusters (GPCs) 750, and one or more partition units 780. The PPU 700 may be connected to a host processor or other PPUs 700 via one or more high-speed NVLink 710 interconnect. The PPU 700 may be connected to a host processor or other peripheral devices via an interconnect 702. The PPU 700 may also be connected to a local memory comprising a number of memory devices 704. In at least one embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 710 interconnect enables systems to scale and include one or more PPUs 700 combined with one or more CPUs, supports cache coherence between the PPUs 700 and CPUs, and CPU mastering. Data and/or commands may be transmitted by the NVLink 710 through the hub 730 to/from other units of the PPU 700 such as one or more copy engines, a video encoder, a video decoder, a power management unit, etc. (not explicitly shown).

The I/O unit 705 may be configured to transmit and receive communications (e.g., commands, data, etc.) from a host processor (not shown) over the interconnect 702. The I/O unit 705 may communicate with the host processor directly via the interconnect 702 or through one or more intermediate devices such as a memory bridge. In at least one embodiment, the I/O unit 705 may communicate with one or more other processors, such as one or more the PPUs 700 via the interconnect 702. In at least one embodiment, the I/O unit 705 implements a Peripheral Component Interconnect Express (PCIe) interface for communications over a PCIe bus and the interconnect 702 is a PCIe bus. In at least one embodiment, the I/O unit 705 may implement other types of well-known interfaces for communicating with external devices.

The I/O unit 705 decodes packets received via the interconnect 702. In at least one embodiment, the packets represent commands configured to cause the PPU 700 to perform various operations. The I/O unit 705 transmits the decoded commands to various other units of the PPU 700 as the commands may specify. For example, some commands may be transmitted to the front end unit 715. Other commands may be transmitted to the hub 730 or other units of the PPU 700 such as one or more copy engines, a video encoder, a video decoder, a power management unit, etc. (not explicitly shown). In other words, the I/O unit 705 may be configured to route communications between and among the various logical units of the PPU 700.

In at least one embodiment, a program executed by the host processor encodes a command stream in a buffer that provides workloads to the PPU 700 for processing. A workload may comprise several instructions and data to be processed by those instructions. The buffer may be a region in a memory that is accessible (e.g., read/write) by both the host processor and the PPU 700. For example, the I/O unit 705 may be configured to access the buffer in a system memory connected to the interconnect 702 via memory requests transmitted over the interconnect 702. In at least one embodiment, the host processor writes the command stream to the buffer and then transmits a pointer to the start of the command stream to the PPU 700. The front end unit 715 receives pointers to one or more command streams. The front end unit 715 manages the one or more streams, reading commands from the streams and forwarding commands to the various units of the PPU 700.

The front end unit 715 is coupled to a scheduler unit 720 that configures the various GPCs 750 to process tasks defined by the one or more streams. The scheduler unit 720 is configured to track state information related to the various tasks managed by the scheduler unit 720. The state may indicate which GPC 750 a task is assigned to, whether the task is active or inactive, a priority level associated with the task, and so forth. The scheduler unit 720 manages the execution of a plurality of tasks on the one or more GPCs 750.

The scheduler unit 720 is coupled to a work distribution unit 725 that is configured to dispatch tasks for execution on the GPCs 750. The work distribution unit 725 may track a number of scheduled tasks received from the scheduler unit 720. In at least one embodiment, the work distribution unit 725 manages a pending task pool and an active task pool for each of the GPCs 750. The pending task pool may comprise a number of slots (e.g., 32 slots) that contain tasks assigned to be processed by a particular GPC 750. The active task pool may comprise a number of slots (e.g., 4 slots) for tasks that are actively being processed by the GPCs 750. As a GPC 750 finishes the execution of a task, that task may be evicted from the active task pool for the GPC 750 and one of the other tasks from the pending task pool is selected and scheduled for execution on the GPC 750. If an active task has been idle on the GPC 750, such as while waiting for a data dependency to be resolved, then the active task may be evicted from the GPC 750 and returned to the pending task pool while another task in the pending task pool is selected and scheduled for execution on the GPC 750.

The work distribution unit 725 communicates with the one or more GPCs 750 via XBar 770. The XBar 770 is an interconnect network that couples many of the units of the PPU 700 to other units of the PPU 700. For example, the XBar 770 may be configured to couple the work distribution unit 725 to a particular GPC 750. Although not shown explicitly, one or more other units of the PPU 700 may also be connected to the XBar 770 via the hub 730.

The tasks are managed by the scheduler unit 720 and dispatched to a GPC 750 by the work distribution unit 725. The GPC 750 is configured to process the task and generate results. The results may be consumed by other tasks within the GPC 750, routed to a different GPC 750 via the XBar 770, or stored in the memory 704. The results can be written to the memory 704 via the partition units 780, which may implement a memory interface for reading and writing data to/from the memory 704. The results can be transmitted to another PPU 700 or CPU via the NVLink 710. In at least one embodiment, the PPU 700 includes a number U of partition units 780 that is equal to the number of separate and distinct memory devices 704 coupled to the PPU 700.

In at least one embodiment, a host processor executes a driver kernel that implements an application programming interface (API) that enables one or more applications executing on the host processor to schedule operations for execution on the PPU 700. In at least one embodiment, multiple compute applications are simultaneously executed by the PPU 700 and the PPU 700 provides isolation, quality of service (QOS), and independent address spaces for the multiple compute applications. An application may generate instructions (e.g., API calls) that cause the driver kernel to generate one or more tasks for execution by the PPU 700. The driver kernel may output tasks to one or more streams being processed by the PPU 700. Each task may comprise one or more groups of related threads, wherein may be referred to as a warp. In at least one embodiment, a warp comprises 32 related threads that may be executed in parallel. Cooperating threads may refer to a plurality of threads including instructions to perform the task and that may exchange data through shared memory.

Figure 8A:
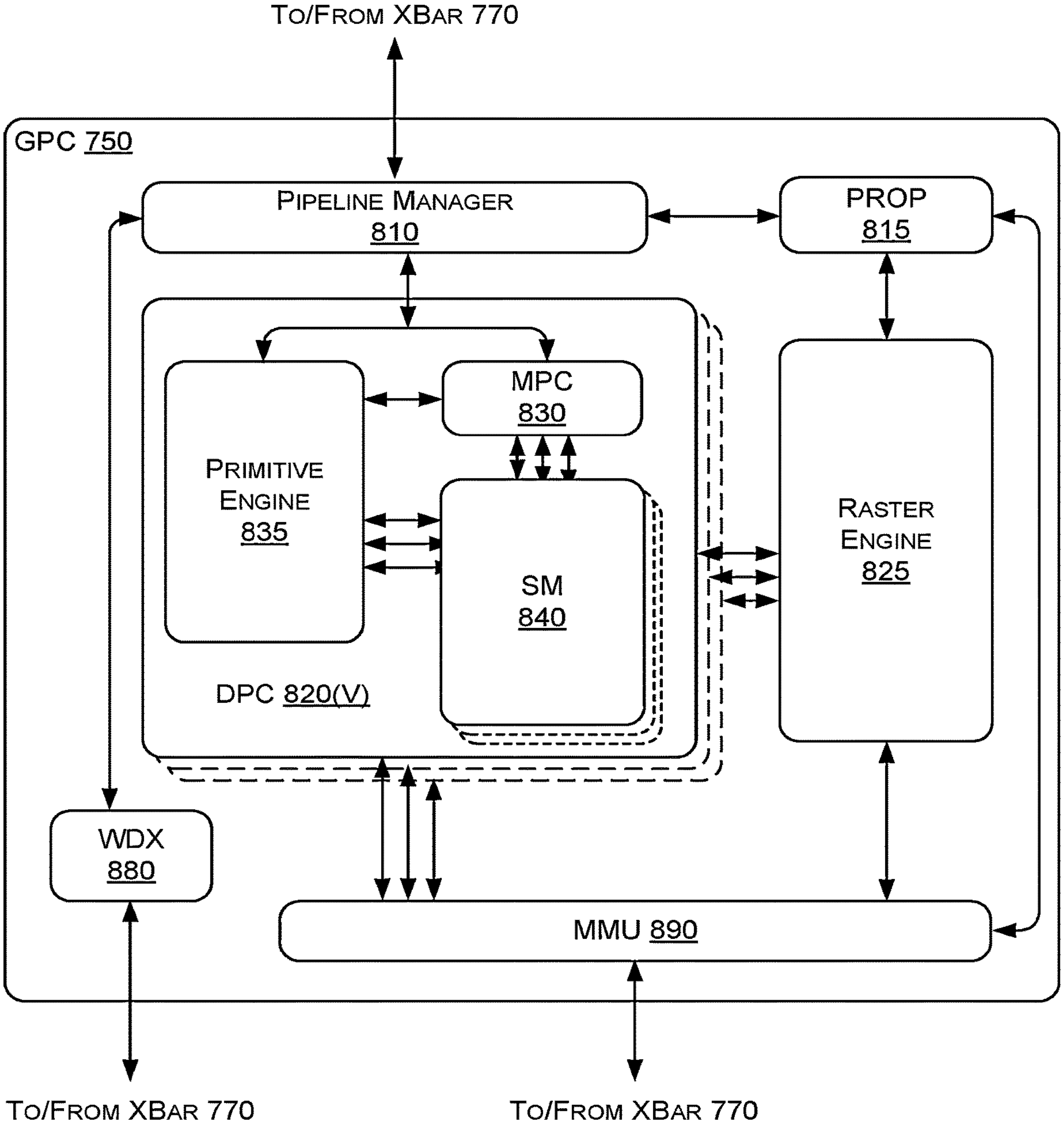
FIG. 8A illustrates an example general processing cluster within the parallel processing unit of FIG. 7 suitable for use in implementing at least some embodiments of the present disclosure.

FIG. 8A illustrates an example GPC 750 of the PPU 700 of FIG. 7 suitable for use in implementing at least some embodiments of the present disclosure. As shown in FIG. 8A, each GPC 750 may include a number of hardware units for processing tasks. In at least one embodiment, each GPC 750 includes a pipeline manager 810, a pre-raster operations unit (PROP) 815, a raster engine 825, a work distribution crossbar (WDX) 880, a memory management unit (MMU) 890, and one or more Data Processing Clusters (DPCs) 820. It will be appreciated that the GPC 750 of FIG. 8A may include other hardware units in lieu of or in addition to the units shown in FIG. 8A.

In at least one embodiment, the operation of the GPC 750 is controlled by the pipeline manager 810. The pipeline manager 810 manages the configuration of the one or more DPCs 820 for processing tasks allocated to the GPC 750. In at least one embodiment, the pipeline manager 810 may configure at least one of the one or more DPCs 820 to implement at least a portion of a graphics rendering pipeline. For example, a DPC 820 may be configured to execute a vertex shader program on the programmable streaming multiprocessor (SM) 840. The pipeline manager 810 may also be configured to route packets received from the work distribution unit 725 to the appropriate logical units within the GPC 750. For example, some packets may be routed to fixed function hardware units in the PROP 815 and/or raster engine 825 while other packets may be routed to the DPCs 820 for processing by the primitive engine 835 or the SM 840. In at least one embodiment, the pipeline manager 810 may configure at least one of the one or more DPCs 820 to implement a neural network model and/or a computing pipeline.

The PROP unit 815 may be configured to route data generated by the raster engine 825 and the DPCs 820 to a Raster Operations (ROP) unit. The PROP unit 815 may also be configured to perform optimizations for color blending, organizing pixel data, performing address translations, and the like.

The raster engine 825 may include a number of fixed function hardware units configured to perform various raster operations. In at least one embodiment, the raster engine 825 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 825 comprises fragments to be processed, for example, by a fragment shader implemented within a DPC 820.

Each DPC 820 included in the GPC 750 includes an M-Pipe Controller (MPC) 830, a primitive engine 835, and one or more SMs 840. The MPC 830 controls the operation of the DPC 820, routing packets received from the pipeline manager 810 to the appropriate units in the DPC 820. For example, packets associated with a vertex may be routed to the primitive engine 835, which is configured to fetch vertex attributes associated with the vertex from the memory 704. In contrast, packets associated with a shader program may be transmitted to the SM 840.

The SM 840 comprises a programmable streaming processor that is configured to process tasks represented by a number of threads. Each SM 840 is multi-threaded and configured to execute a plurality of threads (e.g., 32 threads) from a particular group of threads concurrently. In at least one embodiment, the SM 840 implements a SIMD (Single-Instruction, Multiple-Data) architecture where each thread in a group of threads (e.g., a warp) is configured to process a different set of data based on the same set of instructions. All threads in the group of threads execute the same instructions. In at least one embodiment, the SM 840 implements a SIMT (Single-Instruction, Multiple Thread) architecture where each thread in a group of threads is configured to process a different set of data based on the same set of instructions, but where individual threads in the group of threads are allowed to diverge during execution. In at least one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

The MMU 890 may provide an interface between the GPC 750 and the partition unit 780. The MMU 890 may provide translation of virtual addresses into physical addresses, memory protection, and arbitration of memory requests. In at least one embodiment, the MMU 890 provides one or more translation lookaside buffers (TLBs) for performing translation of virtual addresses into physical addresses in the memory 704.

Figure 8B:
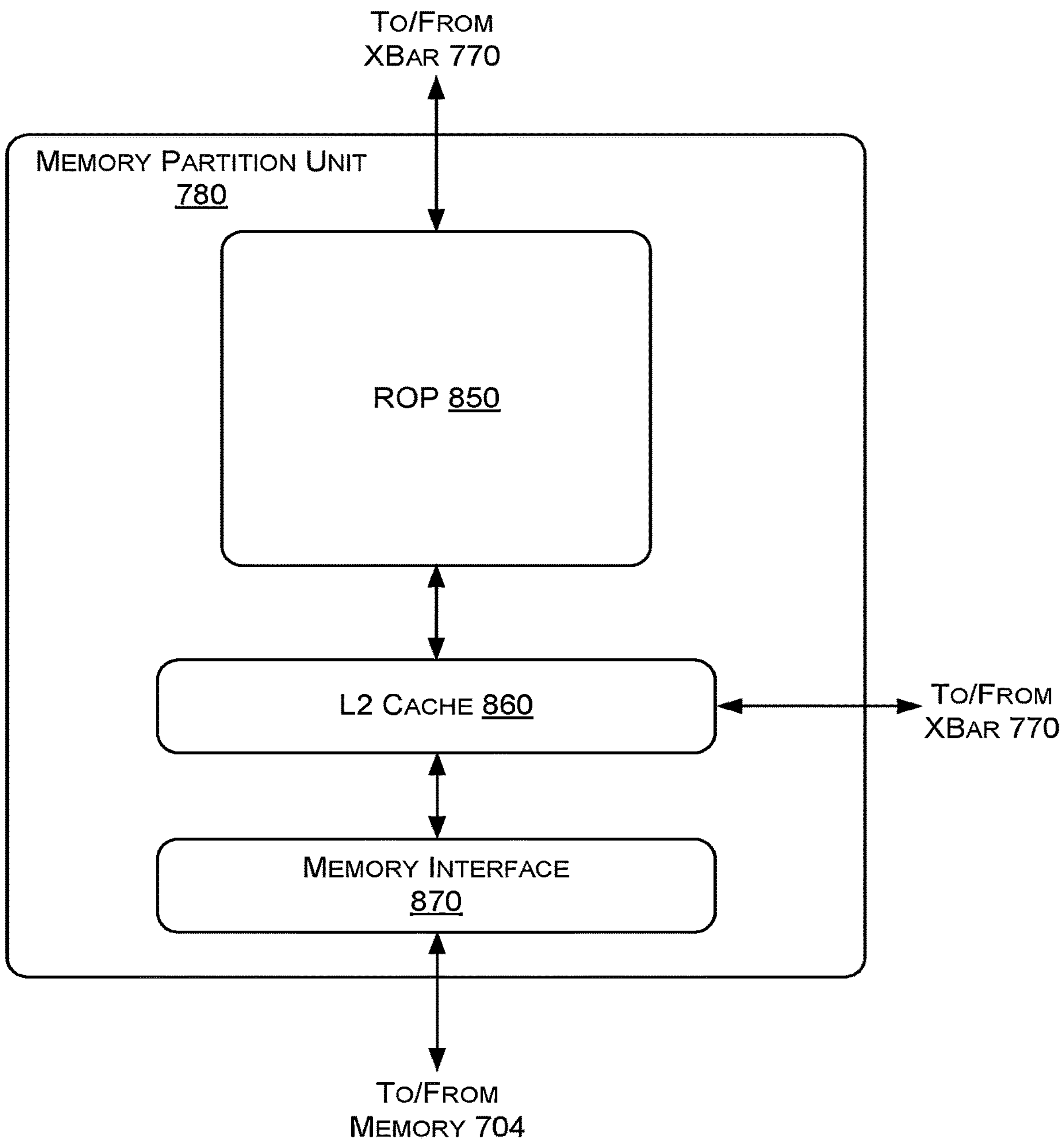
FIG. 8B illustrates an example memory partition unit of the parallel processing unit of FIG. 7 suitable for use in implementing at least some embodiments of the present disclosure.

FIG. 8B illustrates an example memory partition unit 780 of the PPU 700 of FIG. 7 suitable for use in implementing at least some embodiments of the present disclosure. As shown in FIG. 8B, the memory partition unit 780 includes a Raster Operations (ROP) unit 850, a level two (L2) cache 860, and a memory interface 870. The memory interface 870 may be coupled to the memory 704. Memory interface 870 may implement 32, 64, 128, 1024-bit data buses, or the like, for high-speed data transfer. In at least one embodiment, the PPU 700 incorporates U memory interfaces 870, one memory interface 870 per pair of partition units 780, where each pair of partition units 780 is connected to a corresponding memory device 704. For example, the PPU 700 may be connected to up to Y memory devices 704, such as high bandwidth memory stacks or graphics double-data-rate, version 5, synchronous dynamic random access memory, or other types of persistent storage.

In at least one embodiment, the memory interface 870 implements an HBM2 memory interface and Y equals half U. In at least one embodiment, the HBM2 memory stacks are located on the same physical package as the PPU 700, providing substantial power and area savings compared with conventional GDDR5 SDRAM systems. In at least one embodiment, each HBM2 stack includes four memory dies and Y equals 4, with HBM2 stack including two 128-bit channels per die for a total of 8 channels and a data bus width of 1024 bits.

In at least one embodiment, the memory 704 supports Single-Error Correcting Double-Error Detecting (SECDED) Error Correction Code (ECC) to protect data. ECC provides high reliability for compute applications that are sensitive to data corruption. Reliability is especially important in large-scale cluster computing environments where the PPUs 700 process very large datasets and/or run applications for extended periods.

In at least one embodiment, the PPU 700 implements a multi-level memory hierarchy. In at least one embodiment, the memory partition unit 780 supports a unified memory to provide a single unified virtual address space for CPU and PPU 700 memory, enabling data sharing between virtual memory systems. In at least one embodiment the frequency of accesses by a PPU 700 to memory located on other processors is traced to ensure that memory pages are moved to the physical memory of the PPU 700 that is accessing the pages more frequently. In at least one embodiment, the NVLink 710 supports address translation services allowing the PPU 700 to directly access a CPU's page tables and providing full access to CPU memory by the PPU 700.

In at least one embodiment, copy engines transfer data between multiple PPUs 700 or between PPUs 700 and CPUs. The copy engines can generate page faults for addresses that are not mapped into the page tables. The memory partition unit 780 can then service the page faults, mapping the addresses into the page table, after which the copy engine can perform the transfer. With hardware page faulting, addresses can be passed to the copy engines without worrying if the memory pages are resident, and the copy process is transparent.

Data from the memory 704 or other system memory may be fetched by the memory partition unit 780 and stored in the L2 cache 860, which is located on-chip and is shared between the various GPCs 750. As shown, each memory partition unit 780 includes a portion of the L2 cache 860 associated with a corresponding memory device 704. Lower level caches may then be implemented in various units within the GPCs 750. For example, each of the SMs 840 may implement a level one (L1) cache. The L1 cache is private memory that may be dedicated to a particular SM 840. Data from the L2 cache 860 may be fetched and stored in each of the L1 caches for processing in the functional units of the SMs 840. The L2 cache 860 is coupled to the memory interface 870 and the XBar 770.

The ROP unit 850 performs graphics raster operations related to pixel color, such as color compression, pixel blending, and the like. The ROP unit 850 also implements depth testing in conjunction with the raster engine 825, receiving a depth for a sample location associated with a pixel fragment from the culling engine of the raster engine 825. The depth is tested against a corresponding depth in a depth buffer for a sample location associated with the fragment. If the fragment passes the depth test for the sample location, then the ROP unit 850 updates the depth buffer and transmits a result of the depth test to the raster engine 825. It will be appreciated that the number of partition units 780 may be different than the number of GPCs 750 and, therefore, each ROP unit 850 may be coupled to each of the GPCs 750. The ROP unit 850 may track packets received from the different GPCs 750 and determine which GPC 750 that a result generated by the ROP unit 850 is routed to through the Xbar 770. Although the ROP unit 850 is included within the memory partition unit 780 in FIG. 8B, in other examples, the ROP unit 850 may be outside of the memory partition unit 780. For example, the ROP unit 850 may reside in the GPC 750 or another unit.

Figure 9A:
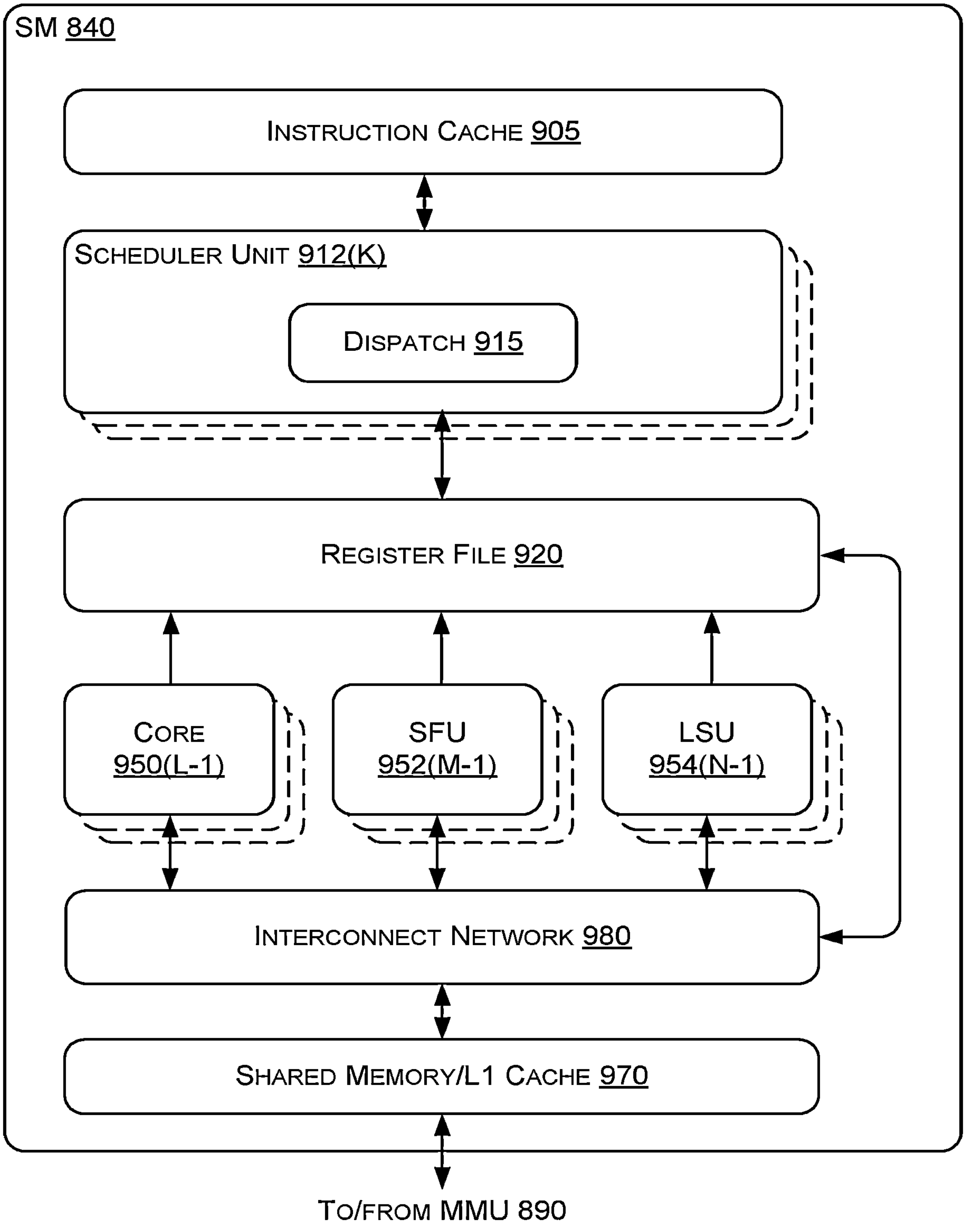
FIG. 9A illustrates an example of the streaming multiprocessor of FIG. 8A suitable for use in implementing at least some embodiments of the present disclosure.

FIG. 9A illustrates an example of the streaming multiprocessor 840 of FIG. 8A suitable for use in implementing at least some embodiments of the present disclosure. As shown in FIG. 9A, the SM 840 includes an instruction cache 905, one or more scheduler units 912, a register file 920, one or more processing cores 950, one or more special function units (SFUs) 952, one or more load/store units (LSUs) 954, an interconnect network 980, and a shared memory/L1 cache 970.

As described herein, the work distribution unit 725 dispatches tasks for execution on the GPCs 750 of the PPU 700. The tasks may be allocated to a particular DPC 820 within a GPC 750 and, if the task is associated with a shader program, the task may be allocated to an SM 840. The scheduler unit 912 may receive the tasks from the work distribution unit 725 and manage instruction scheduling for one or more thread blocks assigned to the SM 840. The scheduler unit 912 may schedule thread blocks for execution as warps of parallel threads, where each thread block is allocated at least one warp. In at least one embodiment, each warp executes 32 threads. The scheduler unit 912 may manage a plurality of different thread blocks, allocating the warps to the different thread blocks and then dispatching instructions from the plurality of different cooperative groups to the various functional units (e.g., cores 950, SFUs 952, and LSUs 954) during each clock cycle.

Cooperative Groups may refer to a programming model for organizing groups of communicating threads that allows developers to express the granularity at which threads are communicating, enabling the expression of richer, more efficient parallel decompositions. Cooperative launch APIs may support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 915 may be configured to transmit instructions to one or more of the functional units. In at least one embodiment, the scheduler unit 912 includes two dispatch units 915 that enable two different instructions from the same warp to be dispatched during each clock cycle. In at least embodiment, each scheduler unit 912 may include a single dispatch unit 915 or additional dispatch units 915.

Each SM 840 may include a register file 920 that provides a set of registers for the functional units of the SM 840. In at least one embodiment, the register file 920 is divided between each of the functional units such that each functional unit is allocated a dedicated portion of the register file 920. In at least one embodiment, the register file 920 is divided between the different warps being executed by the SM 840. The register file 920 provides temporary storage for operands connected to the data paths of the functional units.

Each SM 840 may include L processing cores 950. In at least one embodiment, the SM 840 includes a large number (e.g., 128, etc.) of distinct processing cores 950. Each core 950 may include a fully-pipelined, single-precision, double-precision, and/or mixed precision processing unit that includes a floating point arithmetic logic unit and an integer arithmetic logic unit. In at least one embodiment, the floating point arithmetic logic units implement the IEEE 754-2008 standard for floating point arithmetic. In at least one embodiment, the cores 950 include 64 single-precision (32-bit) floating point cores, 64 integer cores, 32 double-precision (64-bit) floating point cores, and 8 tensor cores.

Tensor cores configured to perform matrix operations, and, in at least one embodiment, one or more tensor cores are included in the cores 950. In particular, the tensor cores may be configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

Training complex neural networks requires massive amounts of parallel computing performance, including floating-point multiplications and additions that are supported by the PPU 700. Inferencing is less compute-intensive than training, being a latency-sensitive process where a trained neural network is applied to new inputs it has not seen before to classify images, translate speech, and infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 700 may form a computing platform capable of delivering performance required for deep neural network-based artificial intelligence and machine learning applications.

In at least one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores may be used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 840 may also include M SFUs 952 that perform special functions (e.g., attribute evaluation, reciprocal square root, and the like). In at least one embodiment, the SFUs 952 may include a tree traversal unit configured to traverse a hierarchical tree data structure. In at least one embodiment, the SFUs 952 may include texture unit configured to perform texture map filtering operations. In at least one embodiment, the texture units are configured to load texture maps (e.g., a 2D array of texels) from the memory 704 and sample the texture maps to produce sampled texture values for use in shader programs executed by the SM 840. In at least one embodiment, the texture maps are stored in the shared memory/L1 cache 870. The texture units implement texture operations such as filtering operations using mip-maps (e.g., texture maps of varying levels of detail). In at least one embodiment, each SM 840 includes two texture units.

Each SM 840 may also include N LSUs 954 that implement load and store operations between the shared memory/L1 cache 970 and the register file 920. Each SM 840 may include an interconnect network 980 that connects each of the functional units to the register file 920 and the LSU 954 to the register file 920, shared memory/L1 cache 970. In at least one embodiment, the interconnect network 980 is a crossbar that can be configured to connect any of the functional units to any of the registers in the register file 920 and connect the LSUs 954 to the register file and memory locations in shared memory/L1 cache 970.

The shared memory/L1 cache 970 may include an array of on-chip memory that allows for data storage and communication between the SM 840 and the primitive engine 835 and between threads in the SM 840. In at least one embodiment, the shared memory/L1 cache 970 comprises 128 KB of storage capacity and is in the path from the SM 840 to the partition unit 780. The shared memory/L1 cache 970 can be used to cache reads and writes. One or more of the shared memory/L1 cache 970, L2 cache 860, and memory 704 may be backing stores.

Combining data cache and shared memory functionality into a single memory block may provide the best overall performance for both types of memory accesses. The capacity may be usable as a cache by programs that do not use shared memory. For example, if shared memory is configured to use half of the capacity, texture and load/store operations can use the remaining capacity. Integration within the shared memory/L1 cache 970 may enable the shared memory/L1 cache 970 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 7, may be bypassed, creating a much simpler programming model. In the general-purpose parallel computation configuration, the work distribution unit 725 may assign and distribute blocks of threads directly to the DPCs 820. The threads in a block may execute the same program, using a unique thread ID in the calculation to ensure each thread generates unique results, using the SM 840 to execute the program and perform calculations, shared memory/L1 cache 970 to communicate between threads, and the LSU 954 to read and write global memory through the shared memory/L1 cache 970 and the memory partition unit 780. When configured for general purpose parallel computation, the SM 840 can also write commands that the scheduler unit 720 can use to launch new work on the DPCs 820.

The PPU 700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In at least one embodiment, the PPU 700 is embodied on a single semiconductor substrate. In at least one embodiment, the PPU 700 is included in a system-on-a-chip (SoC) along with one or more other devices such as additional PPUs 700, the memory, a reduced instruction set computer (RISC) CPU, a memory management unit (MMU), a digital-to-analog converter (DAC), and the like.

In at least one embodiment, the PPU 700 may be included on a graphics card that includes one or more memory devices 704. The graphics card may be configured to interface with a PCIe slot on a motherboard of a desktop computer. In at least one embodiment, the PPU 700 may be an integrated graphics processing unit (iGPU) or parallel processor included in the chipset of the motherboard.

Example of a Computing System

Systems with multiple GPUs and CPUs are used in a variety of industries as developers expose and use more parallelism in applications such as artificial intelligence computing. High-performance GPU-accelerated systems with tens to many thousands or more of compute nodes are deployed in data centers, research facilities, and supercomputers to solve ever larger problems. As the number of processing devices within the high-performance systems increases, the communication and data transfer mechanisms need to scale to support the increased bandwidth.

Figure 9B:
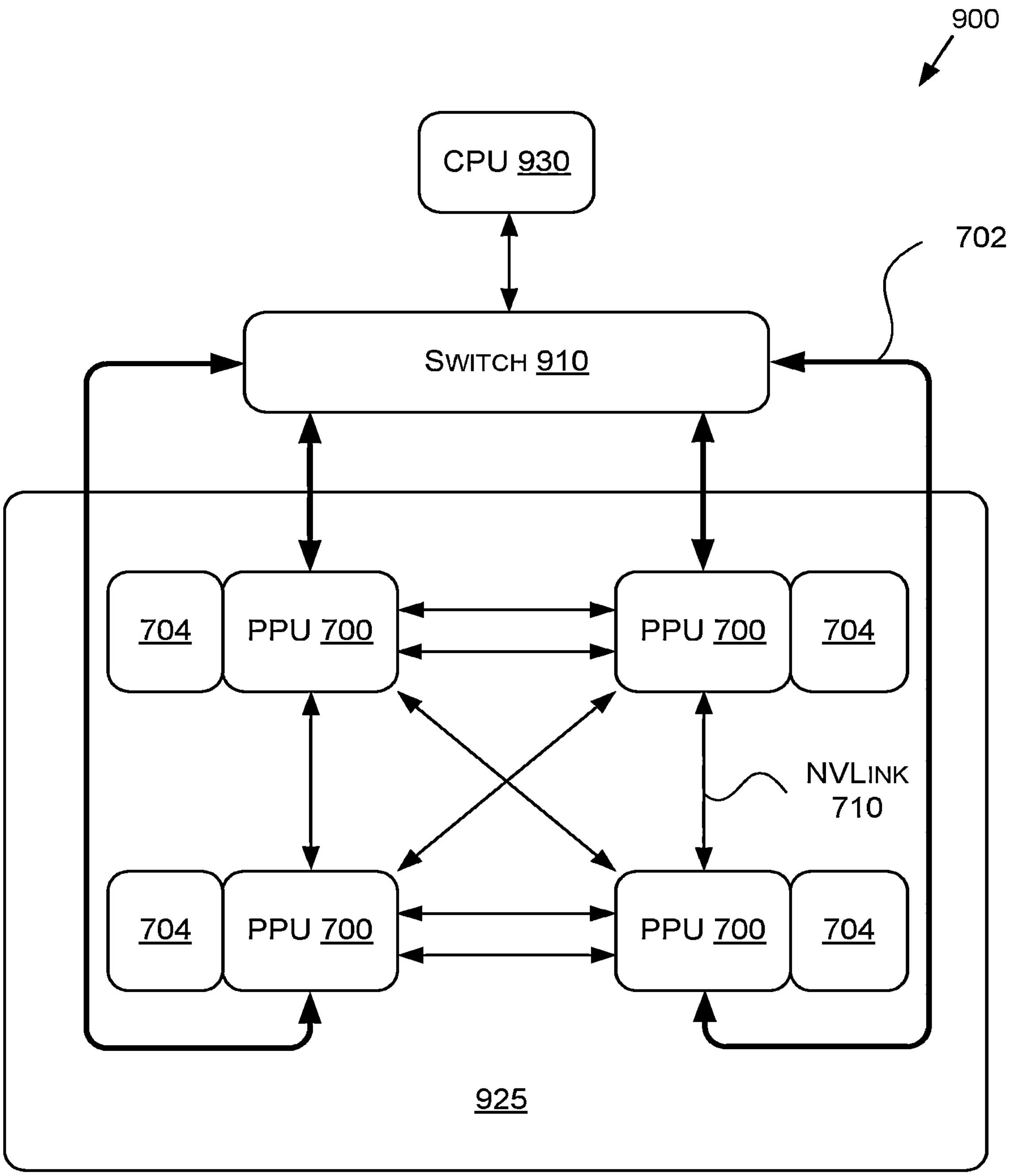
FIG. 9B is an example conceptual diagram of a processing system implemented using the PPU of FIG. 7 suitable for use in implementing at least some embodiments of the present disclosure.

FIG. 9B is an example conceptual diagram of a processing system 900 implemented using the PPU 700 of FIG. 7 suitable for use in implementing at least some embodiments of the present disclosure. The processing system 900 includes a CPU 930, switch 910, and multiple PPUs 700 each and respective memories 704. The NVLink 710 provides high-speed communication links between each of the PPUs 700. Although a particular number of NVLink 710 and interconnect 702 connections are illustrated in FIG. 9B, the number of connections to each PPU 700 and the CPU 930 may vary. The switch 910 interfaces between the interconnect 702 and the CPU 930. The PPUs 700, memories 704, and NVLinks 710 may be situated on a single semiconductor platform to form a parallel processing module 925. In at least one embodiment, the switch 910 supports two or more protocols to interface between various different connections and/or links.

In at least embodiment (not shown), the NVLink 710 provides one or more high-speed communication links between each of the PPUs 700 and the CPU 930 and the switch 910 interfaces between the interconnect 702 and each of the PPUs 700. The PPUs 700, memories 704, and interconnect 702 may be situated on a single semiconductor platform to form a parallel processing module 925. In at least one embodiment (not shown), the interconnect 702 provides one or more communication links between each of the PPUs 700 and the CPU 930 and the switch 910 interfaces between each of the PPUs 700 using the NVLink 710 to provide one or more high-speed communication links between the PPUs 700. In at least one embodiment (not shown), the NVLink 710 provides one or more high-speed communication links between the PPUs 700 and the CPU 930 through the switch 910. In yet at least one embodiment (not shown), the interconnect 702 provides one or more communication links between each of the PPUs 700 directly. One or more of the NVLink 710 high-speed communication links may be implemented as a physical NVLink interconnect or either an on-chip or on-die interconnect using the same protocol as the NVLink 710.

In the context of the present description, a single semiconductor platform may refer to a sole unitary semiconductor-based integrated circuit fabricated on a die or chip. The term single semiconductor platform may also refer to multi-chip modules with increased connectivity which simulate on-chip operation and make substantial improvements over using a conventional bus implementation. Of course, the various circuits or devices may also be situated separately or in various combinations of semiconductor platforms per the desires of the user. Alternately, the parallel processing module 925 may be implemented as a circuit board substrate and each of the PPUs 700 and/or memories 704 may be packaged devices. In at least one embodiment, the CPU 930, switch 910, and the parallel processing module 925 are situated on a single semiconductor platform.

In at least one embodiment, the signaling rate of each NVLink 710 is 20 to 25 Gigabits/second and each PPU 700 includes six NVLink 710 interfaces (as shown in FIG. 9B, five NVLink 710 interfaces are included for each PPU 700). Each NVLink 710 may provide a data transfer rate of 25 Gigabytes/second in each direction, with six links providing 700 Gigabytes/second. The NVLinks 710 can be used exclusively for PPU-to-PPU communication as shown in FIG. 9B, or some combination of PPU-to-PPU and PPU-to-CPU, when the CPU 930 also includes one or more NVLink 710 interfaces.

In at least one embodiment, the NVLink 710 allows direct load/store/atomic access from the CPU 930 to each PPU's 700 memory 704. In at least one embodiment, the NVLink 710 supports coherency operations, allowing data read from the memories 704 to be stored in the cache hierarchy of the CPU 930, reducing cache access latency for the CPU 930. In at least one embodiment, the NVLink 710 includes support for Address Translation Services (ATS), allowing the PPU 700 to directly access page tables within the CPU 930. One or more of the NVLinks 710 may also be configured to operate in a low-power mode.

Figure 9C:
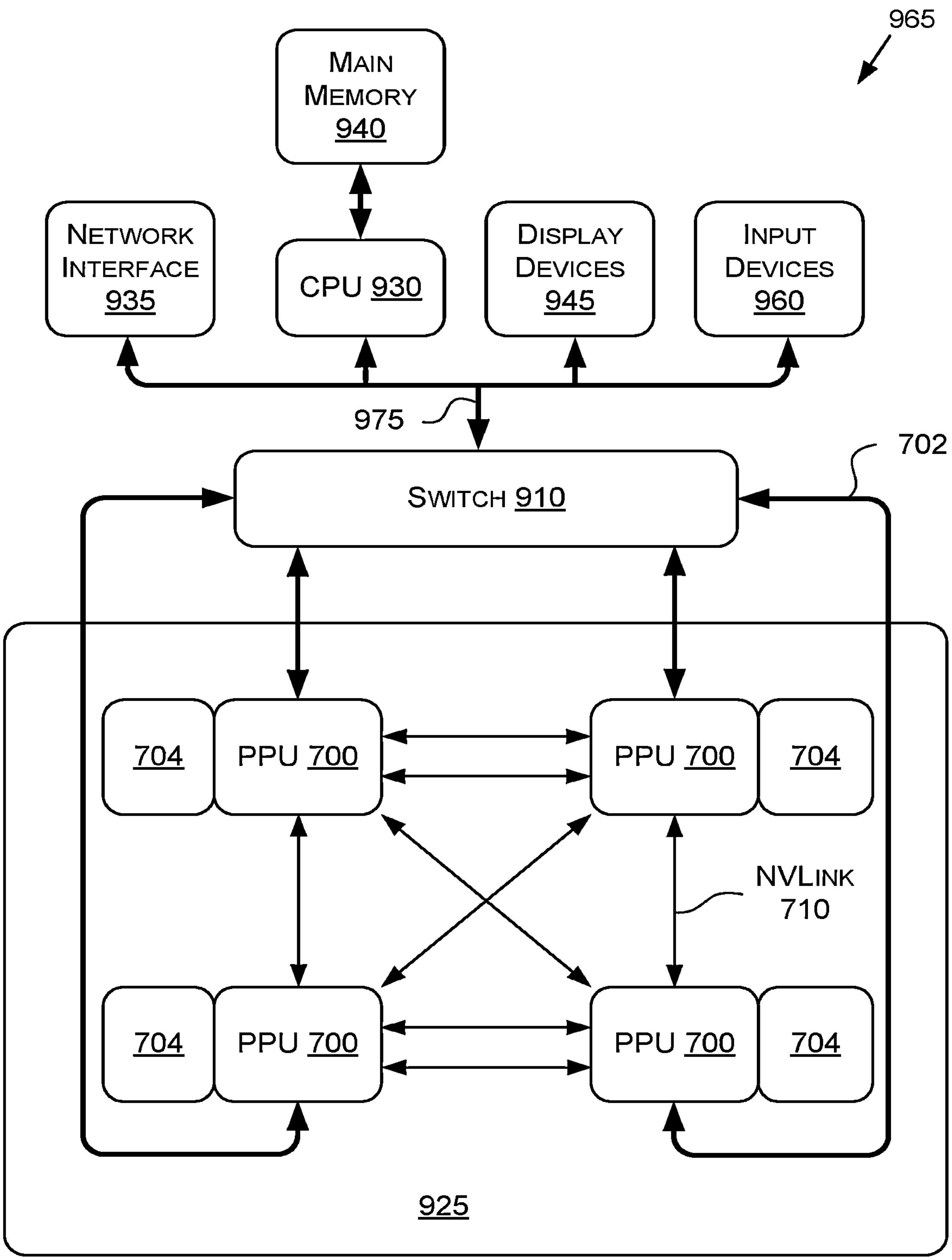
FIG. 9C illustrates an example system in which the various architecture and/or functionality of the various embodiments may be implemented.

FIG. 9C illustrates an example system 965 in which the various architecture and/or functionality of the various previous embodiments may be implemented suitable for use in implementing at least some embodiments of the present disclosure.

As shown, a system 965 is provided including at least one central processing unit 930 that is connected to a communication bus 975. The communication bus 975 may be implemented using any suitable protocol, such as PCI (Peripheral Component Interconnect), PCI-Express, AGP (Accelerated Graphics Port), HyperTransport, or any other bus or point-to-point communication protocol(s). The system 965 also includes a main memory 940. Control logic (software) and data are stored in the main memory 940 which may take the form of random access memory (RAM).

The system 965 also includes input devices 960, the parallel processing module 925, and display devices 945, e.g., a conventional CRT (cathode ray tube), LCD (liquid crystal display), LED (light emitting diode), plasma display or the like. User input may be received from the input devices 960, e.g., keyboard, mouse, touchpad, microphone, and the like. Each of the foregoing modules and/or devices may even be situated on a single semiconductor platform to form the system 965. Alternately, the various modules may also be situated separately or in various combinations of semiconductor platforms per the desires of the user.

Further, the system 965 may be coupled to a network (e.g., a telecommunications network, local area network (LAN), wireless network, wide area network (WAN) such as the Internet, peer-to-peer network, cable network, or the like) through a network interface 935 for communication purposes.

The system 965 may also include a secondary storage (not shown). The secondary storage may include, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive may read from and/or writes to a removable storage unit.

Computer programs, or computer control logic algorithms, may be stored in the main memory 940 and/or the secondary storage. Such computer programs, when executed, enable the system 965 to perform various functions. The memory 940, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 965 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Ray Tracing Pipeline

In at least one embodiment, the PPU 700 comprises a graphics processing unit (GPU). The PPU 700 may be configured to receive commands that specify shader programs for processing graphics data. Graphics data may be defined as a set of primitives such as points, lines, triangles, quads, triangle strips, and the like. A primitive may include data that specifies a number of vertices for the primitive (e.g., in a model-space coordinate system) as well as attributes associated with each vertex of the primitive. The PPU 700 may be configured to process the graphics primitives to generate a frame buffer (e.g., pixel data for each of the pixels of the display).

An application may write model data for a scene (e.g., a collection of vertices and attributes) to a memory such as a system memory or memory 704. The model data may define each of the objects that may be visible on a display. The application may then make an API call to the driver kernel that requests the model data to be rendered and displayed. The driver kernel may read the model data and write commands to the one or more streams to perform operations to process the model data. The commands may reference different shader programs to be implemented on the SMs 840 of the PPU 700. For example, different SMs 840 may be configured to execute different shader programs.

In at least one embodiment, the model data may be processed to perform one or more ray tracing operations, such as real-time tray tracing, to render the model data to a frame buffer. The contents of the frame buffer may be transmitted to a display controller for display on a display device. Ray tracing may refer to any of a variety of techniques for modeling or simulating light transport and/or other aspects of an environment, for example, for use in generating digital images or otherwise simulating the environment. Thus, while certain embodiments may be described with respect to light transport simulation, they may be applicable to simulating, modeling, and/or measuring any of a variety of aspects of an environment. Non-limiting examples of ray tracing include ray casting, recursive ray tracing, distribution ray tracing, photon mapping, and path tracing.

Ray tracing may be used to simulate a variety of optical effects—such as shadows, reflections, refractions, scattering phenomenon, ambient occlusions, global illuminations, or dispersion phenomenon (such as chromatic aberration). Ray tracing may involve generating ray-traced samples by casting rays in a virtual environment to sample lighting and/or other environmental conditions for pixels. The ray traced samples may be combined and used to determine pixel colors for an image. In at least one embodiment, to conserve computing resources, the lighting conditions may be sparsely sampled, resulting in noisy render data. Temporal accumulation may be used to increase the effective sample count by using information from previous frames. To produce a final render that approximates a render of a fully sampled scene, one or more denoising filters may by be applied to the noisy render data to reduce noise.

Many ray tracing algorithms may cast or shoot rays from a virtual camera, or eye, through a 2D viewing plane (e.g., a pixel plane) out into a 3D scene which may include one or more light sources. Some rays may directly reach the viewing plane from a light source, some may be blocked by an object in the scene causing shadows, and some may reflect or refract off an object before reaching the viewing plane. When the rays intersect objects, the color and lighting information at the points of intersection on object surfaces may contribute to various pixel color and illumination levels of pixels of the viewing plane. Different objects may have different surface properties that can cause them to reflect, refract, or absorb light in different ways, which may be accounted for in ray tracing. Rays may reflect off objects and hit other objects, or travel through the surfaces of transparent objects before reaching a light source, and the color and lighting information from all the intersected objects may contribute to the final pixel colors.

Figure 10:
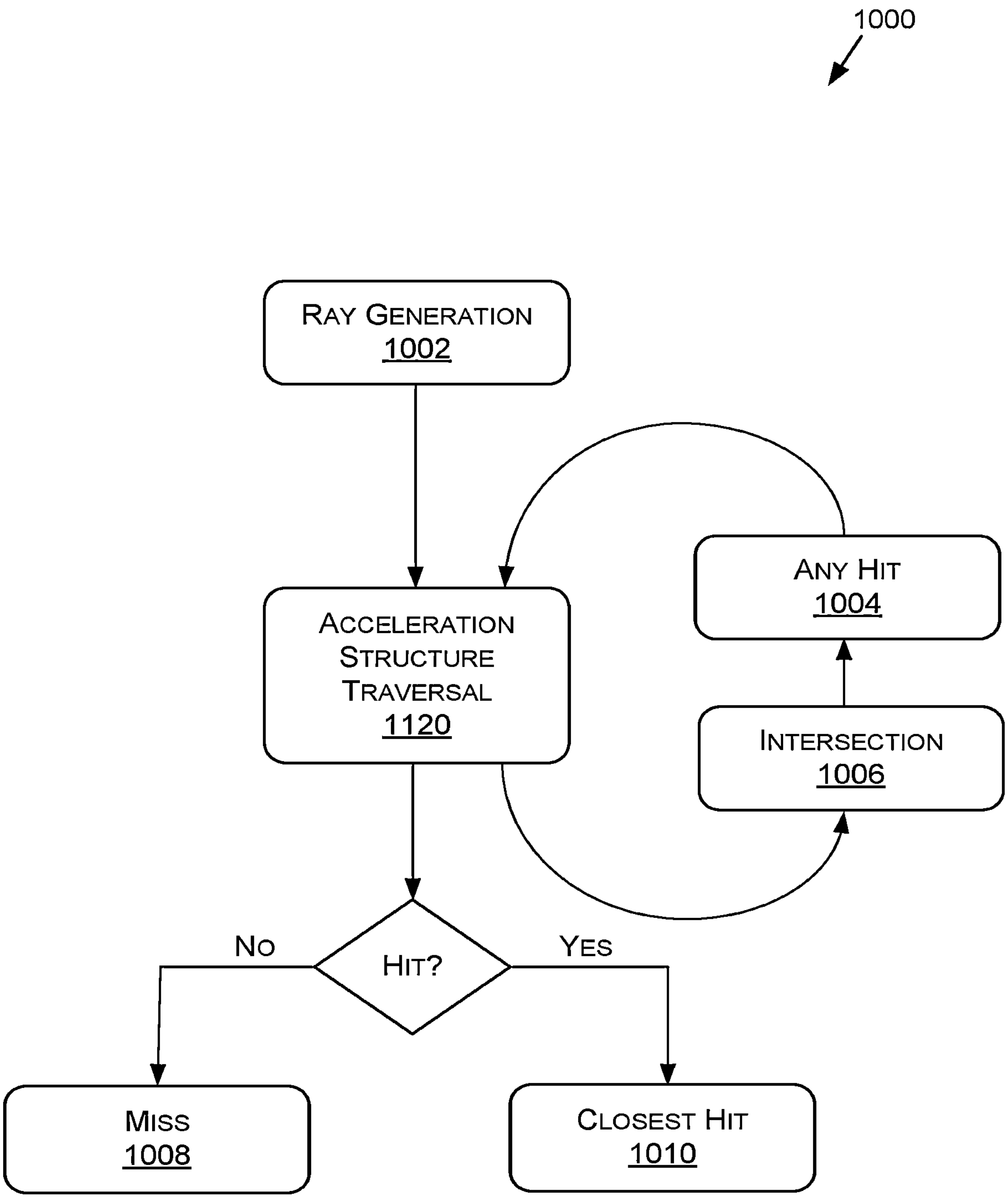
FIG. 10 illustrates an example ray tracing pipeline suitable for use in implementing at least some embodiments of the present disclosure.

FIG. 10 illustrates an example ray tracing pipeline 1000 suitable for use in implementing at least some embodiments of the present disclosure. By way of example, and not limitations, the ray tracing pipeline 1000 may be implemented by the PPU 700 of FIG. 7, in accordance with at least one embodiment. The ray tracing pipeline 1000 may include processing steps implemented to generate 2D computer-generated images from 3D geometry data using one or more ray tracing techniques.

In at least one embodiment, the ray tracing pipeline 1000 may be constructed using one or more ray generation shaders 1002, one or more any hit shaders 1004, one or more intersection shaders 1006, one or more miss shaders 1008, and/or one or more closest hit shaders 1010.

The ray tracing pipeline 1000 may be implemented via an application executed by a host processor, such as a CPU. In at least one embodiment, a device driver may implement an application programming interface (API) that defines various functions that can be used by an application in order to generate graphical data for display. The device driver may refer to a software program that includes instructions that control the operation of the PPU 700, or other PPU used to implement the ray tracing pipeline 1000. The API may provide an abstraction for a programmer that lets a programmer use specialized graphics hardware, such as the PPU 700, to generate the graphical data without requiring the programmer to use the specific instruction set for the PPU 700. The application may include an API call that is routed to the device driver for the PPU 700. The device driver may interpret the API call and perform various operations to respond to the API call. In at least one embodiment, the device driver performs operations by executing instructions on the CPU. In at least one embodiment, the device driver performs operations, at least in part, by launching operations on the PPU 700 using an input/output interface between the CPU and the PPU 700. In at least one embodiment, the device driver is configured to implement the ray tracing pipeline 1000 using the hardware of the PPU 700.

Various programs may be executed within the PPU 700 in order to implement the various stages of the ray tracing pipeline 1000. For example, the device driver may launch a kernel on the PPU 700 to execute a stage implementing a ray generation shader 1002 on an SM 840 (or multiple SMs 840). The device driver (or the initial kernel executed by the PPU 700) may also launch other kernels on the PPU 700 to execute other stages of the ray tracing pipeline 1000.

The ray generation shader 1002 may be the first shader involved in ray tracing dispatch. The ray generation shader 1002 may call a High Level Shader Language (HLSL) function called TraceRay( ) This TraceRay( ) function may cast a single ray into the scene to search for intersections, which may trigger other shaders in the process. In at least one embodiment, the ray generation shader 1002 may call TraceRay( ) any number of times.

An any hit shader 1004 and an intersection shader 1006 may be invoked whenever TraceRay( ) finds a potential intersection between the ray and the scene. The intersection shader 1006 may determine whether the ray intersects an individual geometric primitive—for example a sphere, a subdivision surface, a triangle, or other form of primitive. Once an intersection is found, the any hit shader 1004 may be used to process the intersection further or potentially discard the intersection. An any hit shader 1004 may, by way of example and not limitation, use alpha testing by performing a texture lookup and deciding based on the texel's value whether or not to discard an intersection.

Once TraceRay( ) has completed the search for ray-scene intersections, either a miss shader 1008 or a closest hit shader 1010 may be invoked, depending on the outcome of the search. The closest hit shader 1010 may perform most shading operations, such as, material evaluation, texture lookups, and so on. The miss shader 1008 may be used to implement environment lookups, for example. In at least one embodiment, one or more of the closest hit shader 1010 or the miss shader 1008 may recursively trace rays by calling TraceRay( ) themselves.

The ray tracing pipeline 1000 constructed from any of the various shaders described herein may define a single-ray programming model. In at least one embodiment, each thread of the PPU 700, and/or other PPU used to implement the ray tracing pipeline 1000, may handle one ray at a time. In at least one embodiment, each thread cannot communicate with other threads or see other rays currently being processed. This may simplify shader code, while allowing for vendor-specific optimizations using the API.

In at least one embodiment, different shaders and/or shader types may communicate with each other using a ray payload. A ray payload may refer to a user-defined struct that's passed as an INOUT parameter to TraceRay( ). For example, an any hit shader 1004, a closest hit shader 1010, and/or a miss shader 1008 may read from and/or write to the ray payload, and therefore pass back the result of their computations to the caller of TraceRay( ).

In at least one embodiment, a ray generation shader 1002 may trace primary rays, which may include rays being sent into the scene originating from a virtual camera. However, ray generation shaders 1002 are not limited to this functionality. In at least one embodiment, a ray generation shader 1002 may base ray generation on rasterized g-buffer data (e.g., to trace reflections). Using this approach, ray tracing may be used to complement rasterization, rather than replace rasterization.

When using traditional rasterization, only the shaders required by the current object being drawn may have to be active on the PPU. This may allow rasterization pipeline objects to be relatively small, containing a single set of vertex shaders, pixel shaders, etc. In contrast, a ray tracing pipeline 1000 may be used to arbitrarily shoot rays into the scene. This may mean the rays could hit any object or many objects in the scene. Therefore, it may be the case that all shaders for all objects could potentially be hit and therefore it may be desirable for the shaders to all be resident on the PPU and ready for execution.

In at least one embodiment, a state object may be used to group shaders together for execution. At a high level, a state object of a ray tracing pipeline 1000 may be seen as a binary executable resulting from a link step across all the shaders compiled for the scene. The relationship between different shaders may be specified at state object creation. For example, triplets of intersection shaders 1006, any hit shaders 1004, and/or closest hit shaders 1010 may be bundled into hit groups. The application may specify the state object of the ray tracing pipeline 1000 to be executed when calling a DispatchRays( ) function on a command list. A DispathRays( ) function may invoke a ray generation shader 1002 for each pixel for an image. In at least one embodiment, an application may create any number of state objects for a ray tracing pipeline 1000 and may reuse precompiled shaders for this purpose.

Figure 11:
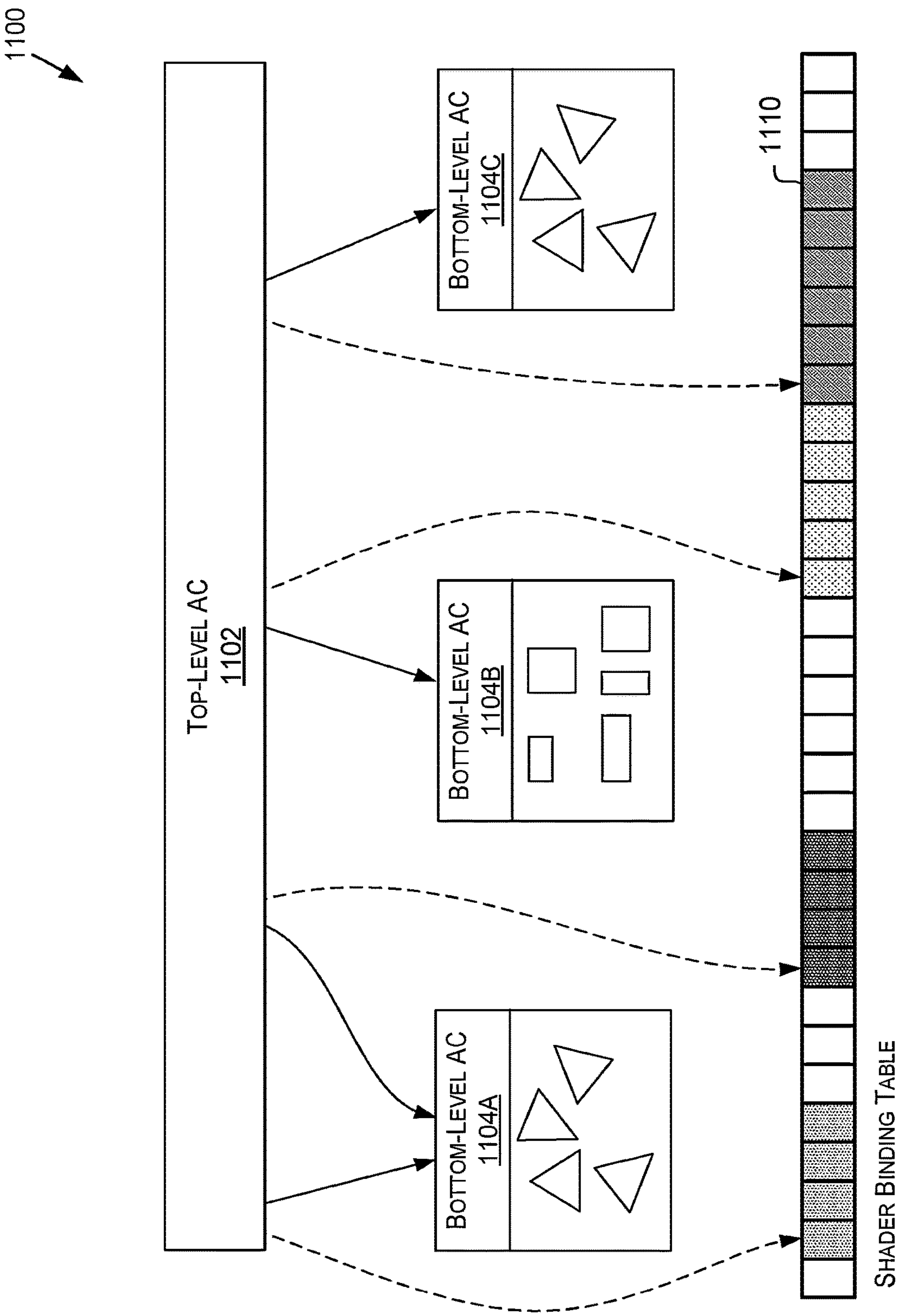
FIG. 11 illustrates an example acceleration structure suitable for use in implementing at least some embodiments of the present disclosure.

Referring now to FIG. 11, FIG. 11 illustrates an example acceleration structure 1100 suitable for use in implementing at least some embodiments of the present disclosure. The acceleration structure 1100 includes one or more top-level acceleration structures, such as a top-level acceleration structure 1102, and one or more bottom-level acceleration structures, such as bottom-level acceleration structures 1104A, 1104B, and 1104C.

The acceleration structure 1100 may comprise a spatial search data structure used in a ray tracing pipeline 1000 for acceleration structure traversal 1020 to efficiently compute intersections of rays with scene geometry. In at least one embodiment, the application may build an acceleration structure 1100 explicitly using a command list method BuildRaytracingAccelerationStructure( ) In at least one embodiment, the application may optimize an acceleration structure 1100 for different types of content, such as static versus animated content.

A top-level acceleration structure 1102 may be built from one or more references to one or more bottom-level acceleration structures 1104A, 1104B, and/or 1104C. These references may be referred to as instance descriptors. Each instance descriptor may include a transformation matrix to position the instance descriptor in the scene, and an offset into a shader table 1110 (which may also be referred to as a "shader binding table") to locate material information. In at least one embodiment, a top-level acceleration structure 1102 may be used as a scene parameter provided to TraceRay( ) in a ray generation shader 1002, and may represent an entry point of the intersection search.

A ray tracing pipeline 1000 may specify the shaders that exist in a scene and an acceleration structure 1100 may specify geometry for the scene. The shader table 1110 may refer to a data structure used to tie the geometry to the shaders. For example, the shader table 1110 may define which shader is associated with which object in the scene. In addition, the shader table 1110 may hold information about the resources accessed by each shader, such as textures, buffers, and constants.

A shader table 1110 may comprise a chunk of PPU memory, which may be managed by the application. The application may be responsible for allocating the resource, filling the shader table 1110 with valid data, transferring it to the PPU, and correctly synchronizing the shader table 1110 with ray tracing dispatches. The application may also maintain multiple shader tables 1110, and, for example, multi-buffer them to update one copy while using another for rendering.

A shader table 1110 may comprise an array of equal-sized shader records. Each shader record may associate a shader (or a hit group) with a set of resources. In at least one embodiment, there may exist one record per geometry object in the scene, and a shader table 1110 may include thousands of entries or more.

Figure 12:
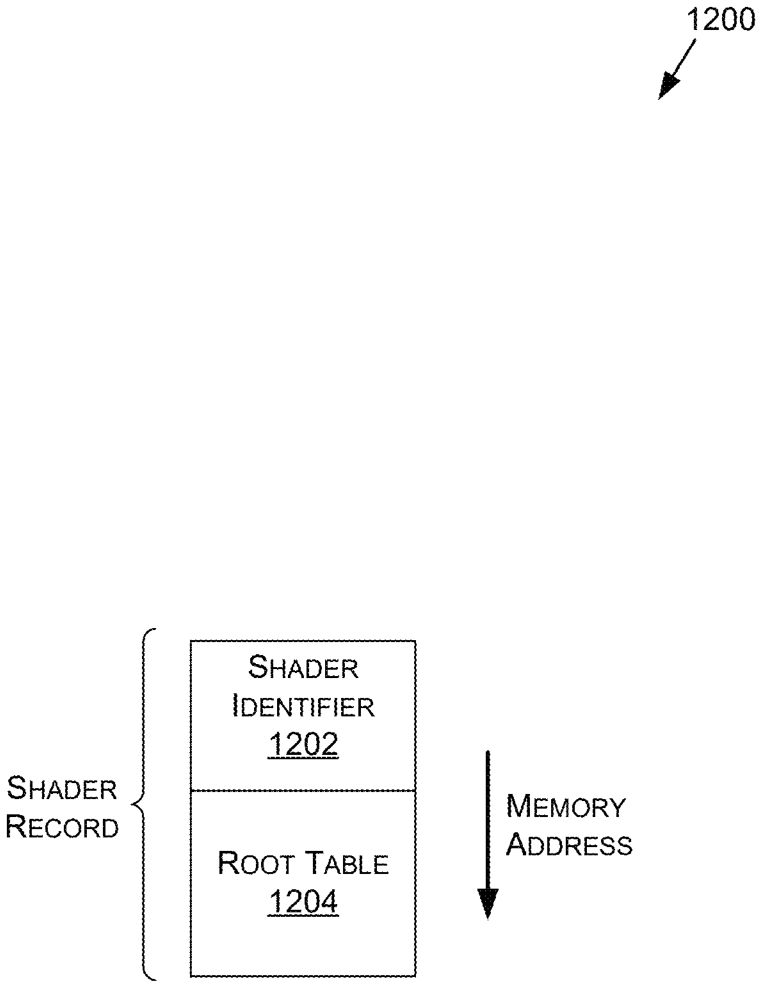
FIG. 12 illustrates an example shader record suitable for use in implementing at least some embodiments of the present disclosure.

Referring now to FIG. 12, FIG. 12 illustrates an example shader record 1200 suitable for use in implementing at least some embodiments of the present disclosure. The shader record 1200 is an example of a shader record that may be included in the shader table 1110 of FIG. 11. The shader record 1200 includes a shader identifier 1202 and a root table 1204.

In at least one embodiment, the shader identifier 1202 may be represented in a beginning portion of the shader record 1200 in memory. The shader identifier 1202 may be an opaque identifier, which the application obtains by querying for the shader identifier 1202 from a compiled shader. The root table 1204 may contain the shader's resources. The layout of the root table 1204 may be defined by the shader's local root signature. The root signature may contain any combination of constants, descriptor tables, and root descriptors. For ray tracing, the application may directly access the root table 1204 in memory (e.g., rather than using "setter" methods), which may allow for efficient updates. In at least one embodiment, a shader table 1110 may be updated from a PPU shader.

As described herein, shader table offsets may be used when building a top-level acceleration structure 1102 from instance descriptors. The system may use these offsets to locate the correct shader record 1200 whenever TraceRay( ) finds an intersection. The system may then bind the resources defined in the shader record 1200 and execute the appropriate shader for the intersected geometry.

Example Computing Device

Figure 13:
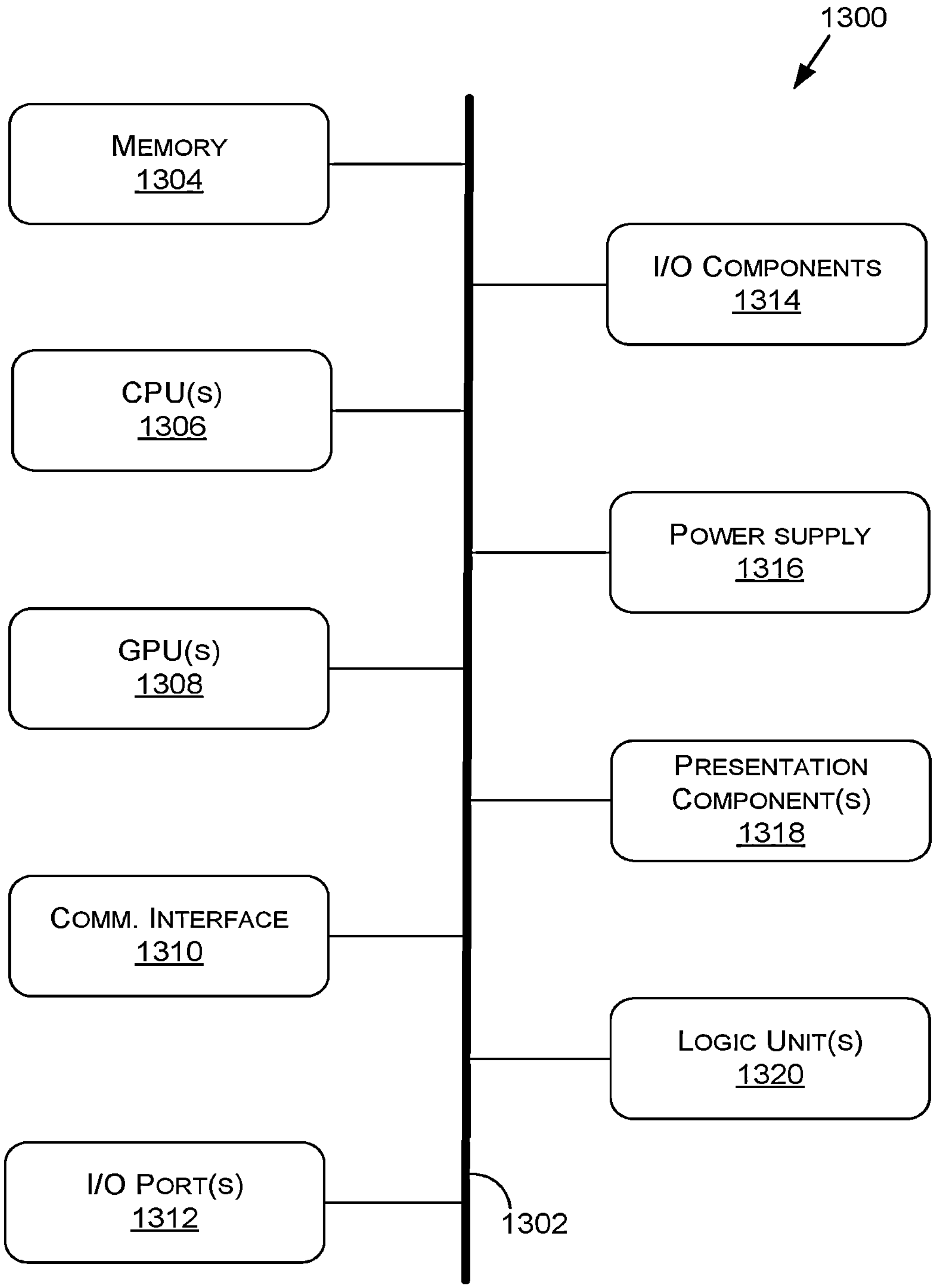
FIG. 13 is a block diagram of an example computing device suitable for use in implementing some embodiments of the present disclosure.

FIG. 13 is a block diagram of an example computing device(s) 1300 suitable for use in implementing at least some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more pups, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
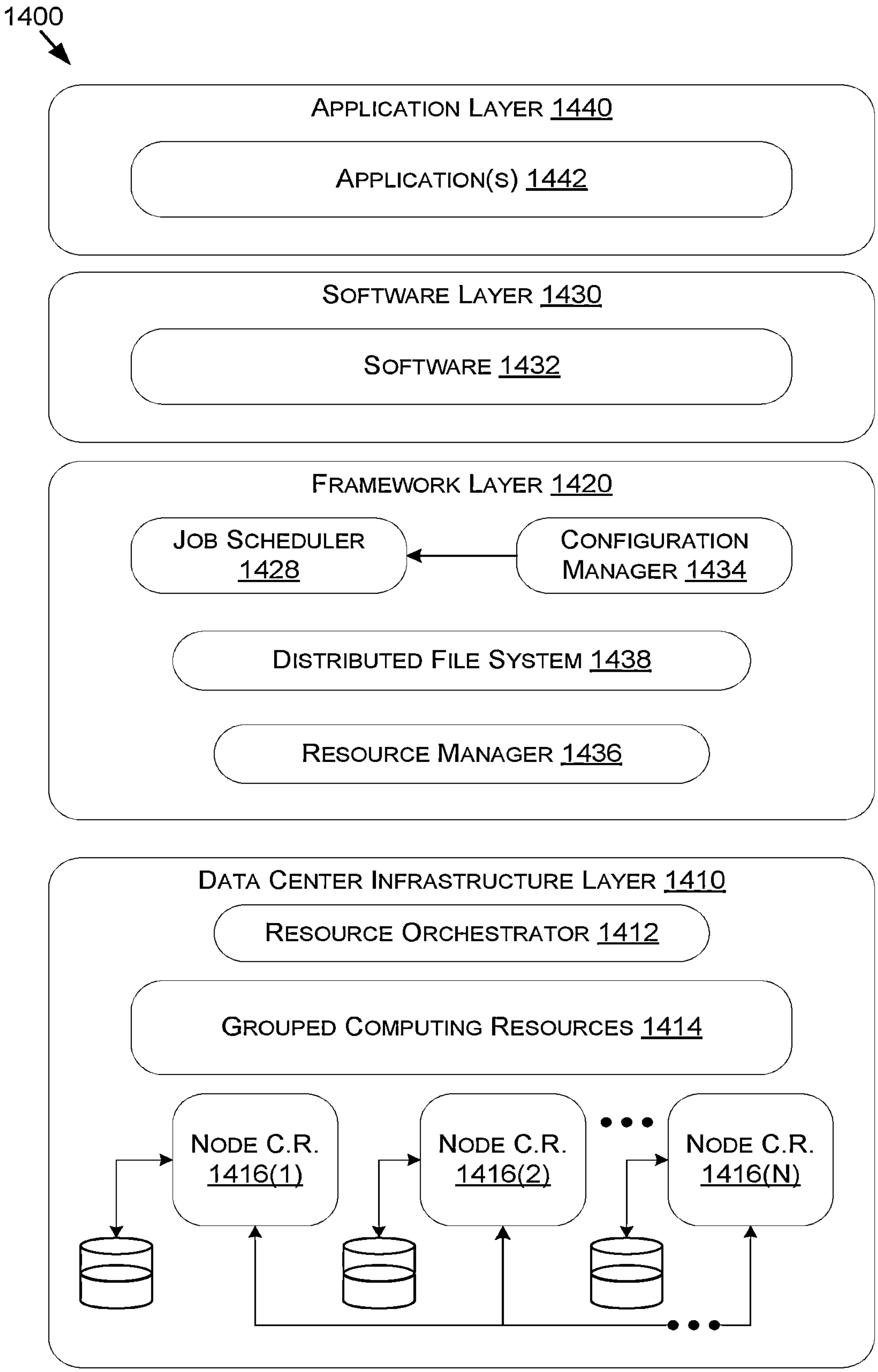
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161(N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1428, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1428 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1428. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416(1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underused and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

detecting an interaction of a ray with an object in an environment;

generating one or more samples of energy that correspond to one or more simulated scatterings of light transported through one or more subsurface interactions of one or more rays within the object;

resampling the one or more samples of energy using a target function that models one or more portions of subsurface light transport to generate one or more resampled samples that represent an amount of energy transported to the interaction from one or more internal interactions within the object; and rendering an image corresponding to the environment based at least on combining the one or more resampled samples with data representing light energy transported to the interaction from the environment outside of the object.

2. The method of claim 1, wherein the target function includes one or more of:

one or more first variables representing a distance between a first location corresponding to the interaction and a second location corresponding to a second interaction of one or more second rays with the object, the second interaction included in the one or more internal interactions;

one or more second variables representing irradiance corresponding to the second location; or one or more third variables representing one or more material properties associated with the object.

3. The method of claim 1, wherein the target function includes a physics-based model of the one or more portions of subsurface light transport, the physics-based model including an analytical function representing a boundary term of a lighting equation for the interaction, the lighting equation including an absorption term, a scattering term, and the boundary term.

4. The method of claim 1, wherein the combining includes retrieving at least a portion of the data from a frontside lighting cache that stores one or more irradiance values corresponding to a frontside of the object with respect to a camera.

5. The method of claim 1, wherein the target function computes the energy at the one or more internal interactions using a source distribution function that defines a direction of one or more rays scattered from a location corresponding to the interaction with the object.

6. The method of claim 1, wherein the target function corresponds to a single scattering transmission of lighting for the interaction, and the method further includes:

determining, using a diffusion profile, energy that corresponds to a multiple scattering transmission of lighting for the interaction, wherein the rendering of the image is further based at least on a combination of the energy that corresponds to the multiple scattering transmission and the one or more resampled samples.

7. The method of claim 1, wherein the resampling includes:

updating one or more reservoirs of samples using the one or more samples to generate one or more updated reservoirs of samples based at least on the target function; and selecting the one or more resampled samples from the one or more updated reservoirs of samples.

8. The method of claim 1, wherein the data represents a plurality of samples corresponding to a second amount of light energy transported to the interaction from the environment outside of the object.

9. The method of claim 1, wherein the resampling includes:

updating one or more sets of samples using the one or more resampled samples and the target function to generate one or more first updated sets of samples;

selecting one or more initial resampled samples from the one or more first updated sets of samples;

updating the one or more first updated sets of samples using the one or more initial resampled samples and the target function to generate one or more second updated sets of samples; and selecting the one or more resampled samples from the one or more second updated sets of samples.

10. A system comprising:

one or more processing units to perform operations including:

determining one or more samples of energy that correspond to one or more scatterings of light transported through one or more subsurface interactions of one or more rays within an object;

determining one or more sets of samples of energy associated with a location corresponding to the object;

filtering the one or more sets of samples of energy using a target function that models one or more portions of subsurface light transport to select, from the one or more sets of samples of energy, a subset of one or more samples of energy that represents an amount of energy transported to the location from one or more internal interactions within the object; and rendering an image based at least on combining the subset of one or more samples with data representing light energy transported to the location from an environment outside of the object.

11. The system of claim 10, wherein the target function includes one or more of:

one or more first variables representing a distance between the location and a second location corresponding to an interaction of a ray with the object;

one or more second variables representing energy corresponding to the second location; or one or more third variables representing one or more material properties associated with the object.

12. The system of claim 10, wherein the filtering is based at least on converting the one or more sets of samples of energy from a first distribution corresponding to a bidirectional scattering distribution function to a second distribution corresponding to the target function.

13. The system of claim 10, wherein the one or more sets of samples of energy are determined using one or more cached irradiance values from a backside lighting cache, the backside lighting cache storing the one or more cached irradiance values based at least on the one or more cached irradiance values corresponding to a backside of the object relative to a camera in the environment.

14. The system of claim 10, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

15. One or more processors comprising:

one or more circuits to render an image based at least on:

generating one or more samples of energy that correspond to one or more subsurface scatterings of light transported through one or more subsurface interactions of one or more rays within an object, resampling the one or more samples of energy using a target function that models one or more portions of subsurface light transport to generate one or more resampled samples that represent an amount of energy transported to a location corresponding to the object from one or more internal interactions within the object, and combining the one or more resampled samples with data representing light energy transported to the location from an environment outside of the object.

16. The one or more processors of claim 15, wherein the target function includes one or more of:

one or more first variables representing a distance between the location and a second location corresponding to an interaction of a ray with the object;

one or more second variables representing energy corresponding to the second location; or one or more third variables representing one or more material properties associated with the object.

17. The one or more processors of claim 15, wherein the resampling is based at least on converting one or more sets of samples from a first distribution corresponding to a source probability distribution function to a second distribution corresponding to the target function.

18. The one or more processors of claim 15, wherein the one or more samples are determined using one or more cached irradiance values from a backside lighting cache, the backside lighting cache storing the one or more cached irradiance values based at least on the one or more cached irradiance values corresponding to a backside of the object relative to a camera in the environment.

19. The one or more processors of claim 15, wherein the resampling includes:

updating one or more reservoirs of samples using the one or more samples and the target function to generate one or more updated reservoirs of samples; and selecting the one or more resampled samples from the one or more updated reservoirs of samples.

20. The one or more processors of claim 15, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *